United States Patent [19]

Uehara

[11] Patent Number: 4,989,106
[45] Date of Patent: Jan. 29, 1991

[54] CASSETTE LOADING DEVICE WITH PULL-IN MECHANISM

[75] Inventor: Tsukasa Uehara, Tokyo, Japan

[73] Assignee: Canon Kabushiki Kaisha, Tokyo, Japan

[21] Appl. No.: 512,084

[22] Filed: Apr. 11, 1990

Related U.S. Application Data

[63] Continuation of Ser. No. 218,459, Jul. 11, 1988, abandoned, which is a continuation of Ser. No. 707,871, Mar. 4, 1985, abandoned.

[30] Foreign Application Priority Data

Mar. 2, 1984 [JP] Japan ................... 59-39786

[51] Int. Cl.[5] .................. G11B 17/04; G11B 5/016
[52] U.S. Cl. ................. 360/99.02; 360/99.03; 360/99.05; 360/132; 360/133
[58] Field of Search ............ 360/99.01, 99.02, 99.03, 360/99.06, 97.01, 99.05, 132, 133

[56] References Cited

U.S. PATENT DOCUMENTS

| 4,071,859 | 1/1978 | Sami | 360/96 |
| 4,096,536 | 6/1978 | Cicatelli | 360/96.5 |
| 4,245,266 | 1/1981 | Bauer | 360/99 |
| 4,246,618 | 1/1981 | Bauer | 300/99 |
| 4,272,795 | 6/1981 | Davis, Jr. et al. | 360/99 |
| 4,379,313 | 4/1983 | Tsuchiya | 360/96.5 |
| 4,403,265 | 9/1983 | Okada et al. | 360/96.5 |
| 4,423,445 | 12/1983 | Okada et al. | 360/96.5 |
| 4,497,009 | 1/1985 | Oishi | 360/97 X |
| 4,511,940 | 4/1985 | Yamaguchi et al. | 360/96.6 |
| 4,511,944 | 9/1985 | Saito | 360/97 X |
| 4,546,397 | 10/1985 | Asami et al. | 360/99 |
| 4,573,093 | 2/1986 | Obama et al. | 360/97 |
| 4,604,666 | 8/1986 | Kitahara et al. | 360/99 |
| 4,641,211 | 2/1987 | Okita et al. | 360/99 X |
| 4,646,176 | 2/1987 | Shimaoka et al. | 360/99 X |
| 4,656,542 | 4/1987 | Shibata | 360/99 |
| 4,707,819 | 11/1987 | Ehara | 360/99 X |
| 4,716,477 | 12/1987 | Uehara | 360/99 X |
| 4,727,444 | 2/1988 | Fukushima et al. | 360/99 X |

FOREIGN PATENT DOCUMENTS

| 56-80846 | 7/1981 | Japan | 360/96.6 |
| 58-1890 | 1/1983 | Japan . |
| 58-41571 | 7/1983 | Japan . |

Primary Examiner—Alyssa H. Bowler
Attorney, Agent, or Firm—Toren, McGeady & Associates

[57] ABSTRACT

In a recording and/or reproducing apparatus using a record bearing medium housed within a cassette which is provided with at least one positioning hole extending through the cassette housing, a cassette loading device is provided including a cassette holding device arranged to receive the cassette from a predetermined direction and to be movable in a predetermined direction approximately perpendicular to the receiving direction in a state of holding the cassette, and a pull-in device for pulling the cassette into a predetermined position within the holding device. The pull-in device is provided with an engaging member and pulls the cassette into the holding device by engaging the engaging member with the positioning hole.

37 Claims, 10 Drawing Sheets

FIG.3A  FIG.3B  FIG.3C
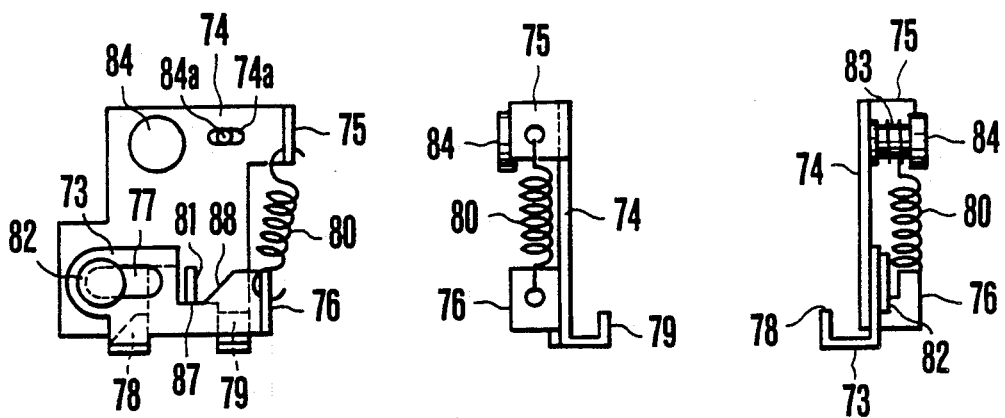
FIG.3D  FIG.3E
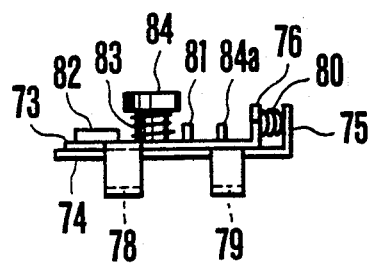 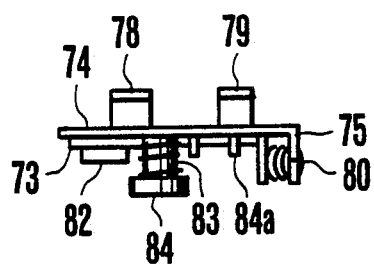
FIG.4
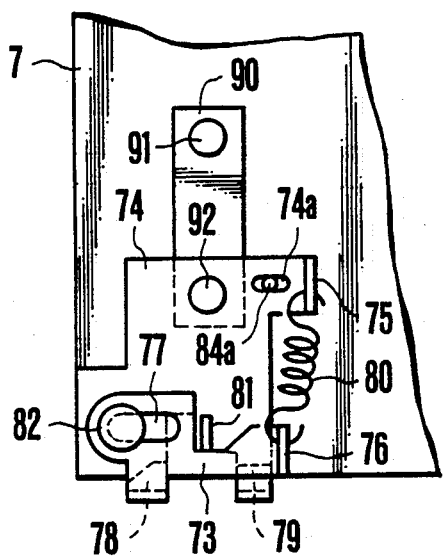

CASSETTE LOADING DEVICE WITH PULL-IN MECHANISM

This is a continuation application of Ser. No. 07/218,459, filed July 11, 1988, which is a continuation of Ser. No. 06/707,871, filed Mar. 4, 1985 now abandoned.

BACKGROUND OF THE INVENTION

1. Field of the Invention

This invention relates to a cassette loading device for a recording and/or reproducing apparatus of the kind to be loaded with a cassette which houses therein a record bearing medium.

2. Description of the Prior Art

Among recording and/or reproducing apparatuses adapted for recording and/or reproducing a signal in or from recording tracks concentrically or helically formed on a disc shaped record bearing medium such as a flexible magnetic disc, an apparatus arranged to have a cassette which houses the disc shaped record bearing medium inserted from the front of the apparatus in loading the apparatus with the cassette is known and referred to as the front loading type.

The front loading type apparatus is generally provided with a gripping member which is arranged at a cassette holder to firmly hold the cassette which is inserted into the cassette holder.

FIGS. 13A and 13B of the accompanying drawings show an example of the conventional firm holding arrangement mentioned above. A leaf spring 34' which has a relatively large urging force is attached to the inner side of the upper part of the cassette holder 7'. When a cassette 2 is inserted by hand from the direction of arrow C, the leaf spring 34' exerts the urging force on the cassette 2. Then, with the cassette 2 further inserted to a predetermined position defined by a bent part 7'a of the cassette holder 7', the cassette 2 is fixedly kept in the predetermined position under the urging force of the leaf spring 34' within the cassette holder 7' as shown in FIG. 13B. Following that, the cassette holder 7' is moved horizontally in the direction of arrow C as necessary. Then, the holder 7' is moved downward. The cassette loading operation then comes to an end when the cassette 2 comes to a predetermined recording or reproducing position within the recording and/or reproducing apparatus. Cassette 2 is taken out by an operation which is carried out in a manner reverse to the manner described above.

In accordance with the above-explained arrangement, the cassette 2 must be pushed inward against the urging force of the leaf spring 34'. This requires a large inserting force. Further, a large force is also required for taking out the cassette 2 against the force of the leaf spring 34' from the cassette holder 7'. Therefore, the conventional cassette loading devices have often been such that the cassette cannot be smoothly inserted and taken out and, in some cases, the inadequate operability tends to damage the cassette 2.

This problem can be solved by weakening the urging force of the leaf spring 34'. However the weakened urging force results in a weaker gripping force on the cassette 2. Then, while the cassette holder 2 is on the move, the vibration, etc. likely causes the cassette 2 to shift its position within the cassette holder 7'. Further, the cassette 2 moves easily within the holder 7' by contacting with other members during the horizontal move of the holder 7'. Under such a condition, the apparatus cannot be adequately loaded with the cassette.

The applicant of the present application has previously filed U.S. patent application Ser. No. 670, 749 (filed Nov. 13, 1984, entitled "RECORD BEARING MEDIUM CONTAINER LOADING DEVICE, Uehara) for a novel record bearing medium container loading device which is capable of solving the above-stated problems of the prior art devices.

The disclosed loading device for a cassette containing therein a record bearing medium comprises: cassette carrying means which includes an elastic member and a cassette receiving member arranged to have the cassette gripped and sandwiched in between them and is arranged to be driven to move in the direction of inserting the cassette; position restricting means which restricts the position of the elastic member in the cassette carrying means; and driving means for driving the cassette carrying means in the cassette inserting direction. In loading the cassette, the record bearing medium containing cassette is pushed in between the elastic member and the cassette receiving member of the cassette carrying means until the elastic member is restricted by the restricting means. Following that, the driving means performs an inward pulling action on the carrying means. During this pulling action, the cassette pinching force of the carrying means is increased with the restricting means arranged to act on the elastic member.

SUMMARY OF THE INVENTION

The present invention relates to an improvement on the above-stated device previously proposed by the present applicant. It is a principal object of this invention to provide a novel cassette loading device and a recording and/or reproducing apparatus having the cassette loading device which is capable of ensuring adequate cassette loading with a smooth and accurate pull-in operation on a cassette housing a record bearing medium without damaging the cassette and which excels in operability permitting the operation to be carried out with a light force.

It is more specific object of this invention to provide a novel cassette loading device and a recording and/ or reproducing apparatus having the cassette loading device which is capable of eliminating all the shortcomings of the prior art devices mentioned above by utilizing at least one of the positioning holes normally provided in a cassette.

Under these objects, a cassette loading device embodying an aspect of this invention and incorporated in a recording and/or reproducing apparatus using a cassette which houses a record bearing medium and is provided with at least one positioning part, comprises cassette holding means arranged to receive the cassette from a predetermined direction and to be movable in a predetermined direction different from the receiving direction, and pull-in means for pulling the cassette into a predetermined position within the holding means, wherein the pull-in means is provided with an engaging member and pulls the cassette into the holding means by engaging the engaging member with the positioning part.

The above and further objects, aspects and features of this invention will be apparent from the following detailed description of a preferred embodiment thereof taken in connection with the accompanying drawings

BRIEF DESCRIPTION OF THE DRAWINGS

FIGS. 3A–3E are illustrations of a shutter operating device arranged on a recording and/or reproducing apparatus for operating a shutter provided on a cassette, FIG. 3A being a plan view of the shutter operating device; FIG. 3B showing the reverse side of the shutter operating device; FIG. 3C being a front view of the shutter operating device; FIG. 3D being a right side view thereof; and FIG. 3E being a left side view thereof.

FIG. 4 is a plan view showing an example of a modification of the shutter operating device of FIG. 3.

FIG. 5B showing it as in a state having the shutter open; and FIG. 3C showing it in a state having closed the shutter and immediately before the closing claw comes to ride on the side face of the shutter.

FIGS. 6B, 6C and 6D being sectional views of the shutter in its various states which take place when the cassette is inserted including a state immediately before opening, a state immediately after opening and a state after completion of opening the shutter, respectively.

FIG. 13A is a side view of a cassette holder showing it in a state before having a cassette inserted therein, while FIG. 13B is also a side view of the cassette holder with the cassette completely inserted therein.

DETAILED DESCRIPTION OF THE PREFERRED EMBODIMENT

In the case of a preferred embodiment of the present invention which will be described below, the invention is applied to a cassette loading device adapted for a recording and/or reproducing apparatus which uses a cassette containing a flexible magnetic disc. However, the invention is of course not only applicable to a device of that kind but also applicable to devices of other kinds that are adapted for recording and/or reproducing apparatuses which use cassettes containing different record bearing media such as optical or electrostatic capacity type disc or sheet or magnetic tape (in a VCR).

Figure 1:
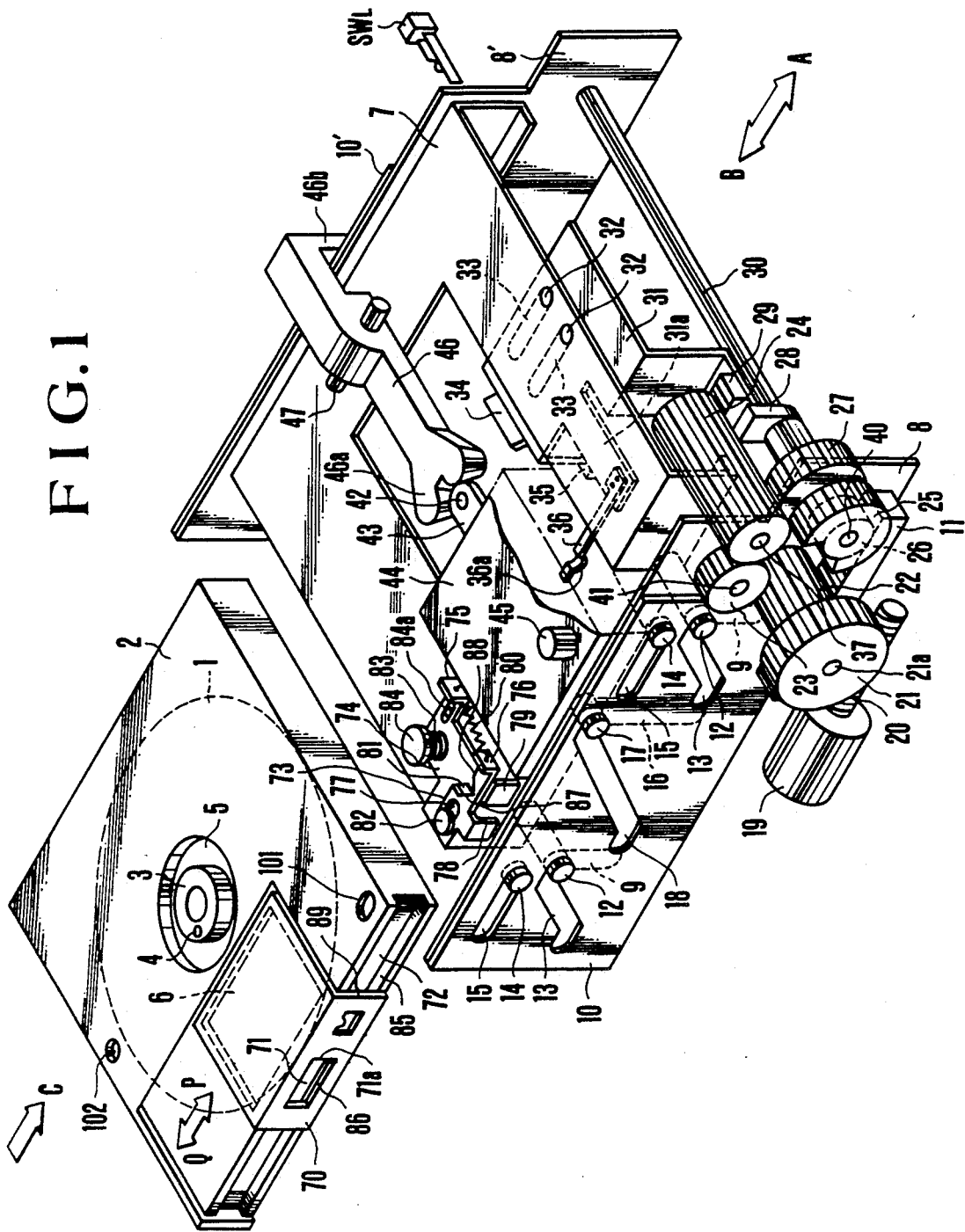
FIG. 1 is an oblique view showing a cassette loading device arranged according to the present invention as an embodiment thereof.
Figure 2:
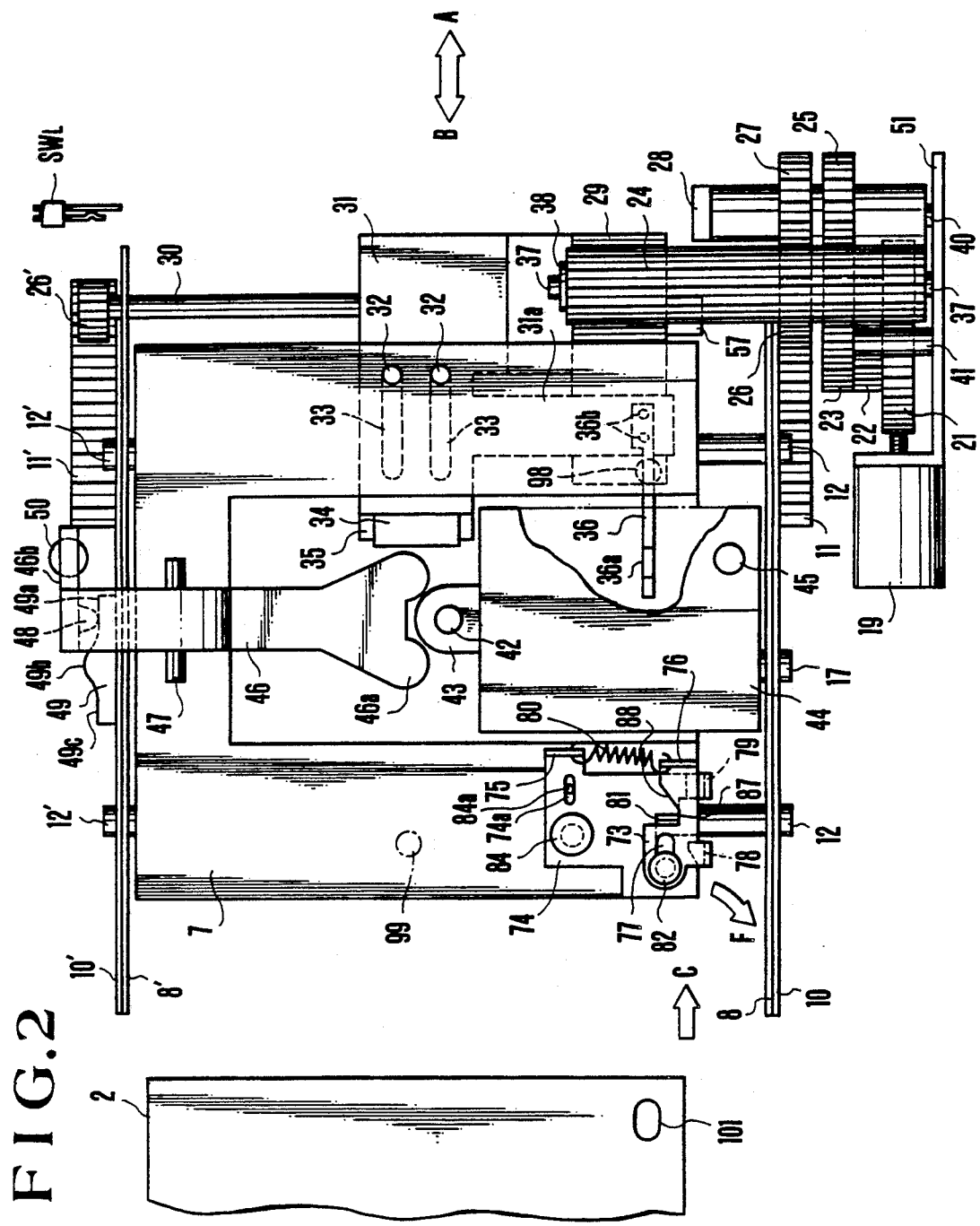
FIG. 2 is a plan view showing the upper side of the embodiment.
Figure 9:
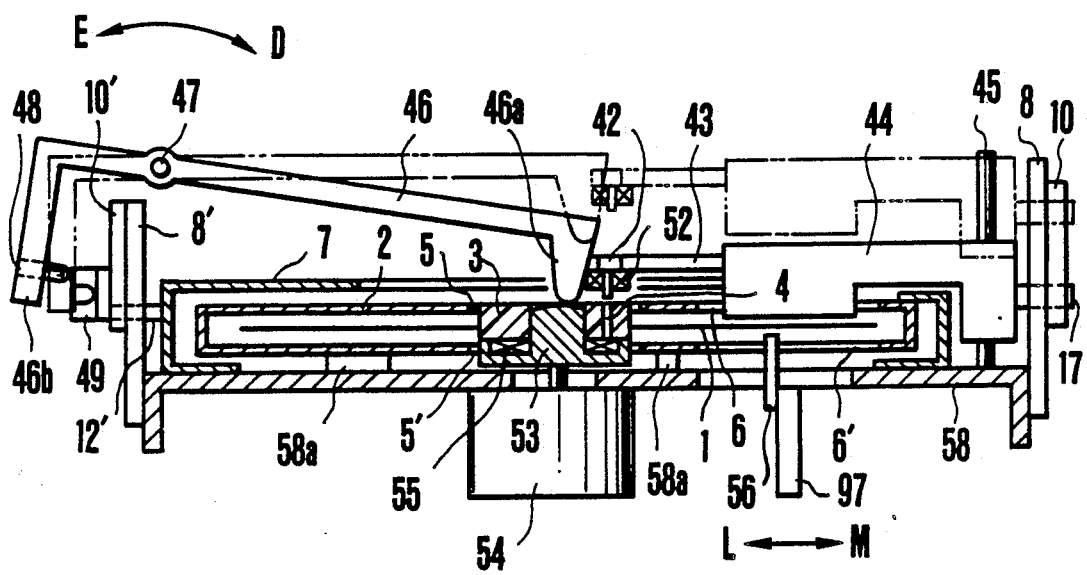
FIG. 9 is a sectional side view showing a center core pressing member and a stabilizer in the states of having the cassette in an initial position and in a loading position.

Referring to FIGS. 1 and 2, the illustrations show a flexible magnetic disc 1 which is an example of a disc shaped record bearing medium; a cassette 2 which contains the magnetic disc 1 therein; a center core 3 which is secured to the middle part of the magnetic disc 1 and is made of a plastic material; a rotation pulse generating pin 4 (hereinafter referred to as PG pin) provided in the center core 3; a pair of holes 5 and 5' provided in the upper and lower sides of the cassette 2 in a position corresponding to the center core 3 of the magnetic disc 1; and a window or opening 6 provided in the upper side of the cassette 2 for allowing a disc stabilizer which will be described later to be inserted through this opening. As is shown in FIG. 9, another window or opening 6' is provided in the lower side of the cassette 2 for allowing a magnetic head to be inserted therethrough and is located in a position corresponding to the stabilizer inserting opening 6.

The stabilizer inserting opening 6 and the magnetic head inserting opening 6' are normally covered by a shutter 70 which is a cover member arranged to be movable in the directions of arrows P and Q. The shutter 70 is provided with a shutter closing hole 71 which is formed in one side of the shutter 70 to allow a shutter closing claw 78 to enter thereinto. The shutter closing hole 71 has a lower edge 86. A groove 72 is arranged along one side of the cassette 2 to have the shutter closing claw 78 and a shutter opening claw 79 enter thereinto as will be described later herein. The groove 72 is provided with a lower edge 85. A reference numeral 89 denotes an end face of the shutter 70. The shutter 70 opens the openings 6 and 6' when it moves in the direction of arrow Q and closes them when it moves in the other direction of arrow P as will be further described in detail later herein.

The cassette 2 is provided with a pair of positioning holes 101 and 102 which extend through the upper and lower sides thereof for determining the loading position of the cassette 2 in loading a recording and/or reproducing apparatus with the cassette 2. The hole 101 is formed at a corner in an elliptic shape on the same side as the shutter 70 and on the upstream side of the shutter 70 in the direction of arrow C along which the cassette 2 is to be inserted. The other hole 102 is formed in a circular shape in the middle part close to the rear end of the cassette 2.

The embodiment is provided with a cassette holder 7 as cassette holding means which is arranged to receive and hold the inserted cassette 2. Though not shown in the drawings, the cassette holder 7 is provided with a known leaf spring at the ceiling part thereof to press the inserted cassette 2. Two pins 12 are provided on one side of the cassette holder 7, while two pins 12' are provided on another side of the holder 7, as shown in FIG. 2. Side plates 8 and 8' are secured by means of screws or the like to a chassis of the body of a recording and/or reproducing apparatus (not shown). These side plates 8 and 8' are disposed on two opposite sides of the cassette holder 7. Two slots 9 are provided in each of the side plates 8 and 8' and vertically extend. The side plate 8 is provided with another slot 16 which also vertically extends. These slots 9 and 16 are arranged to permit the pins 12 which are provided on the sides of the cassette holder 7 and a pin 17 which is provided on one side of a disc stabilizer 44 to be movable up and down, respectively. A slide plate 10 is arranged adjacent to the side plate 8 and is provided with a rack 11 which is formed in a lower end part of the slide plate 10. The slide plate 10 is provided further with two slots 15 which extend in a horizontal direction, two cam slots 13 which are formed in an S-like shape and arranged to restrict the vertical movement of the cassette holder 7, and with a large cam slot 18 which has a shape similar to the cam slots 13 and is arranged to restrict the vertical movement of the stabilizer 44. Another slide plate 10' is likewise provided with a rack 11', two slots 15 and two cam slots 13 for restricting the vertical movement of the cassette holder 7. Pins 14 are arranged on the side plate 8 to guide and restrict the sliding movement of the slide plate 10 along the side plate 8 and are slidably engaged in the slots 15 of the slide plate 10. The other side plate 8' is likewise provided with pins 14 which are engaged in the slots 15 of the other slide plate 10'.

Such being the arrangement, the cassette holder 7 is movable up and down between an uplifted position for receiving and taking out the cassette 2 and a lowered position for completing the cassette loading operation. With the cassette holder 7 in the cassette loading completed position, a pair of positioning pins 98 and 99 (FIG. 2) which are secured to a chassis base plate 58 shown in FIG. 9 respectively extend into the positioning holes 101 and 102, so that the cassette 2 can be correctly positioned.

A pin 17 is provided on one side of the disc stabilizer 44 and slidably engages in the slot 16 of the side plate 8 and the cam slot 18 of the slide plate 10.

A loading motor 19 is arranged to slide the slide plates 10 and 10' and a cassette pull-in and eject member 31 for loading and unloading the cassette 2. A worm gear 20 is arranged to be rotated by the loading motor 19. A worm wheel 21 engages with the worm gear 20. A gear 22 is coaxially connected with the worm wheel 21. A gear 23 engages with the gear 22 and is arranged to be rotated by a driving torque received from the gear 22 which coaxially rotates with the worm wheel 21. A gear unit 24 is arranged to transmit the driving torque from the gear 23 to the pull-in and eject member 31' via a rack 29 which is secured to the pull-in and eject member 31. The gear unit 24 is arranged such that, although it transmits the driving torque from the gear 23 to the rack 29, it does not transmit the movement of the rack 29 to the gear 23 and thus serves as one-way clutch (as will be further described later with reference to FIG. 10). With the rotation of the loading motor 19 transmitted to the rack 11 via the worm gear 20, the worm wheel 21, a first partially toothless gear 25, a second partially toothless gear 27 and a gear 26, the slide plate 10 is moved to slide either in the direction of arrow A or in the direction of arrow B. Gear shafts 21a, 37, 40 and 41, for the gears 21 to 25 and 27 are carried by a chassis 51 as shown in FIG. 2. A lever 28 which is coaxially connected with the first and second toothless gears 25 and 27 is arranged to be rotated clockwise when a lever 57 which is provided on one side of the rack 29 moves in the direction of arrow A to come to abut on the lever 28. With the lever 28 thus turned clockwise, the first and second toothless gears 25 and 27 rotate clockwise. The first toothless gear 25 then comes to engage with the gear 22. The first and second toothless gears 25 and 27 are arranged in one unified body. Referring to FIG. 7B, the toothless parts 25a and 27a of these gears 25 and 27 are arranged to have the same angle in the circumferential direction. However, the end of the toothless part 25a of the first toothless gear 25 in the clockwise direction is ahead of the end of the toothless part 27a of the second toothless gear 27 in the clockwise direction. Therefore, when the lever 28 turns clockwise with the lever 57 abutting thereon, the first and second toothless gears 25 and 27 also rotate clockwise at the same time as the lever 28. Then, the first toothless gear 25 first comes to engage with the gear 22. Following this, the gear 22 rotates the first toothless gear 25 clockwise to cause thereby the second toothless gear 27 to engage with the gear 26.

A rotating shaft 30 is arranged to connect the gears 26 and 26'. The gear 26 engages with the rack 11 provided on the slide plate 10 while the gear 26' engages with the rack 11' provided on the other slide plate 10'. With these racks 11 and 11' connected to each other in this manner, the slide plates 10 and 10' are arranged to simultaneously slide in the same direction.

A cassette pull-in eject member 31 is arranged to further pull the cassette 2 to a predetermined position within the cassette holder 7 when the cassette 2 is inserted along the direction of arrow C into the holder 7 in loading the apparatus with the cassette 2. In taking the cassette 2 out of the holder 7, the member 31 ejects the cassette 2 from this position in the direction reverse to the direction of arrow C. The cassette pull-in and eject member 31 is provided with a cassette receiving part 35 and a leaf spring 34 which is arranged to elastically hold the fore end of the cassette 2 with a relatively weak spring force in conjunction with the cassette receiving part 35. The member 31 is further provided with a sidewise extending arm 31a. To the lower surface of the arm 31a is secured with a screw 36b or the like an engaging member 36. The engaging member 36 is made of a leaf spring or the like and is arranged to elastically engage at its engaging part 36a with the elliptic positioning hole 101 of the cassette 2 when the fore end face of the cassette 2 comes to abut upon the vertical face of the cassette receiving part 35.

Pins 32 are arranged on the cassette holder 7 to guide the sliding movement of the pull-in and eject member 31 in the direction of arrow A or B. The pull-in and eject member 31 is provided with slots 33 which are formed in a shape extending in the moving direction of arrows A and B and are arranged to engage with the pins 32. The leaf spring 34 is attached to the upper fore end part of the pull-in end eject member 31 The cassette receiving part 35 is disposed at the lower fore end part of the pull-in and eject member 31.

The rack 29 is secured to the pull-in and eject member 31 and has the lever 57 arranged on one side thereof. The rack 29 thus moves together with the pull-in and eject member 31 when the latter slides in the direction of arrow A or B. When the pull-in and eject member 31 slides in the direction of arrow A, the rack 29 therefore also moves in the same direction to have the lever 57 abut on the lever 28. This in turn causes the first and second toothless gears 25 and 27 to rotate clockwise. The rack 29 is engaging with the gear unit 24.

The gear shafts 37, 40 and 41 which are shown in FIG. 2 are carried by a chassis 51. The gear shaft 37 carries the gear unit 24, the gear shaft 40 carries the first and second toothless gears 25 and 27 and the lever 28 while the gear shaft 41 carries the gear 23 For the gear unit 24 carried by the gear shaft 37 there is provided a retaining ring 38.

A detection yoke 42 is arranged as a disc rotation phase detector to detect the PG pin 4 for detecting thereby the rotation phase of the magnetic disc 1. A supporting arm 43 is attached to the disc stabilizer 44 and is arranged to carry the detection yoke 42. The arm 43 thus moves upward and downward together with the stabilizer 44. The stabilizer 44 is arranged to come close to the upper surface of the magnetic disc 1 by descending through the stabilizer inserting window 6 of the cassette 2 and thus stabilizes the magnetic disc 1 for a magnetic head 56 which is opposed to the lower surface of the magnetic disc 1. A guide shaft 45 pierces through the stabilizer 44 and is set upright on a mounting chassis 58 (FIG. 9).

A center core pressing member 46 is arranged to push the center core 3 of the magnetic disc 1 for mounting the center core 3 on a spindle 53 of a disc rotating motor 54. A shaft 47 pivotally carries the center core pressing member 46 and is secured to a chassis (not shown). A slide cam 49 is secured to one side of the slide plate 10'. A pin 48 is provided on a bent end part 46b of the center core pressing member 46 as shown in FIG. 2. The pin 48 is abutting on the slide cam 49 A spring 50 (FIG. 2) is disposed between the bent end part 46b of the center core pressing member 46 and a chassis (not shown) which is constantly pulling the end part 46b downward, i.e. urging the member 46 to move counterclockwise on the shaft 47.

The shutter 70 which is a covering member for the stabilizer inserting opening 6 and the magnetic head inserting opening 6' provided in the cassette 2 is arranged to be operated to open and close by the following arrangement:

Referring to FIGS. 1, 2, 3A–3E and 5A–5C, a shutter opening member 74 which is provided with an opening claw 79 at a C-shape bent part thereof for opening the shutter 70 is disposed on the upper surface of the cassette holder 7. A spring peg part 75 is arranged on the right side of the shutter opening member 74 to retain one end of a spring 80. A pin 84 pivotally carries the shutter opening member 74 to allow it to vertically swing on the cassette holder 7. A coiled spring 83 is arranged between the pin 84 and the opening member 74 to have the shutter opening member 74 elastically carried by the spring 83 on the cassette holder 7. A bent part 81 is raised from the flat surface of the shutter opening member 74 and is arranged to engage a cam part 88 of the shutter closing member 73. A guide pin 82 is planted on the shutter opening member 74 for guiding the movement of the shutter closing member 73. A pin 84a is arranged to stop the opening member 74 from rotating on a horizontal plane and is planted on the cassette holder 7. The pin 84a engages a slot 74a of the opening member 74.

The shutter closing member 73 is arranged as follows The member 73 is provided with a slot 77 to have the guide pin 82 fitted therein. A closing claw 78 is arranged at a C-shaped bent part of the closing member 73 to close the shutter 70. An end face 87 of the member 73 is arranged to abut on one end of the bent part 81 of the shutter opening member 74. A cam part 88 continues from the end face 87. With the closing member 73 moving relative to the opening member 74, this cam part 88 abuts on one end of the bent part 81 of the opening member 74 to cause the closing member 73 to turn about the guide pin 82 in the direction of arrow F. A spring peg part 76 is disposed at the right end of the closing member 73. A spring 80 is arranged between this spring peg part 76 and another spring peg part 75 which is disposed at one end of the opening member 74. This spring 80 urges the closing member 73 to turn counterclockwise about the guide pin 82.

The shutter closing claw 78 of the shutter closing member 73 is arranged to enter into the shutter closing hole 71 of the shutter 70. The opening claw 79 opens the shutter 70 when the cassette 2 is inserted in the direction of arrow A. At that time, the closing claw 78 enters into the hole 71. When the cassette 2 is taken out in the direction of arrow B, the closing claw 78 which is in the hole 71 serves to close the shutter 70. The closing claw 78 is provided with a tapered part, to enable it to move over the end face 89 of the shutter 70 without difficulty.

The shutter opening member 74 is arranged on the cassette holder 74 to be vertically swingable on the pin 84 and to be elastically carried by the spring 83 for the following reason. Referring to FIG. 9, at the last stage of the descent of the cassette holder 7, the lower surface of the cassette 2 comes to abut on a vertical positioning member 58a provided on the chassis base plate 58 to have its vertical position determined a little before the cassette holder 7 reaches the final lowered position thereof. Under this condition, the cassette holder 7 is further moved down to a certain given extent to elastically press the cassette 2 against the positioning member 58a by a leaf spring which is not shown but is disposed in the ceiling part of the cassette holder 7 and the leaf spring 34 of the pull-in and eject member 31. Then, by the arrangement to have the shutter opening member 74 vertically swingable and elastically carried by the spring 83, the fear of damage of the closing and opening claws 78 and 79 and the end face 86 of the hole 71 of the shutter 70 and the end face 85 of the side groove 72 of the cassette 2 due to their collision with each other is removed at the time of the further descent of the cassette holder 7 which takes place after stopping of the cassette 2, i.e. the over-stroke of the cassette holder 7. When this over-stroke of the cassette holder 7 takes place, the shutter opening member 74 moves up relative to the cassette holder 7 against the force of the spring 83. This absorbs the over-stroke, so that the possibility of the above-stated damage can be eliminated.

FIG. 4 shows an example of a modification of the arrangement to elastically carry the shutter operating mechanism relative to the cassette holder 7.

In the case of FIG. 3A, the shutter opening member 74 is elastically carried relative to the cassette holder 7 by the coiled spring 83 disposed between the pin 84 which is secured to the cassette holder 7 and the shutter opening member 74. In the case of the modification shown in FIG. 4, this carrying means is replaced with an arrangement in which one end of a leaf spring 90 is secured to one end of the shutter opening member 74 by means of a pin 92. The other end of the leaf spring 90 is secured to the cassette holder 7 by means of a pin 91. The shutter opening member 74 is thus elastically carried relative to the cassette holder 7 by this arrangement.

The operation of the shutter opening member 74 for opening the shutter 70 will be described with reference to FIGS. 5A and 5B and that of the shutter closing member 73 for closing the shutter 70 will be also described with reference to FIG. 5C as follows: In these drawings of FIGS. 5A–5C, the cassette holder 7 is omitted from the illustrations.

Figure 5A:
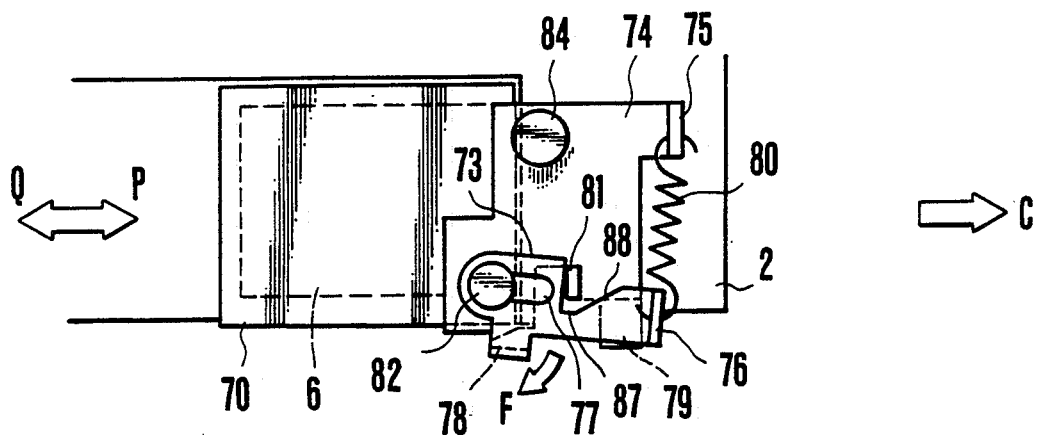
FIGS. 5A–5C show the operation of the shutter operating device, FIG. 5A showing it as in a state immediately before a closing claw of a shutter closing member comes to ride on the shutter.
Figure 5B:
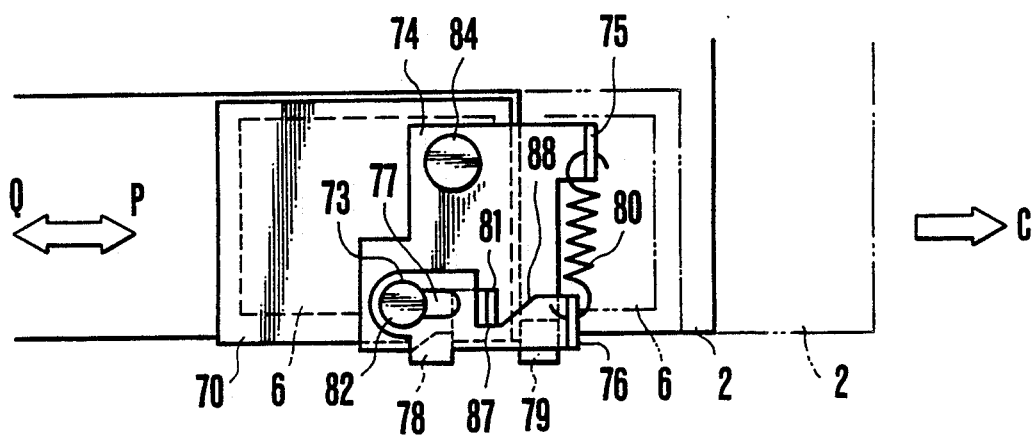

In opening the shutter 70, the closing claw 78 of the shutter closing member 73 and the opening claw 79 of the shutter opening member 74 enter into the groove 72 of the cassette 2 when the cassette 2 is inserted by hand into the cassette holder 7 in the direction of arrow C as shown in FIG. 5A. Under this condition, when the cassette 2 is pushed by hand in the direction of arrow C, the closing claw 78 of the closing member 73 has its tapered part abut on the end face 89 of the shutter 70 mounted on the cassette 2. Then, with the cassette 2 pushed further in the direction of arrow C, the closing member 73 turns in the direction of arrow F about the guide pin 82 against the urging force of the spring 80. The closing claw 78 then rides over the end face 89 of the shutter 70 to come on the side face of the shutter 70. With the closing claw 78 thus positioned on the side face of the shutter 70 while the opening claw 79 of the opening member 74 is in the state of having extended in the groove 72 provided in one side of the shutter 70, when the cassette 2 is further pushed in the direction of arrow C, the closing claw 78 comes to extend into the shutter closing hole 71 provided in one side of the shutter 70 as shown by a full line in FIG. 5B and the opening claw 79 abuts on the end face 89 of the shutter 70. Following that, when the cassette 2 is moved further in the direction of arrow C, the opening claw 79 opens the shutter 70 as shown by a two-dot chain line in FIG. 5B. The stabilizer and magnetic head inserting openings 6 and 6' are then exposed.

Figure 5C:
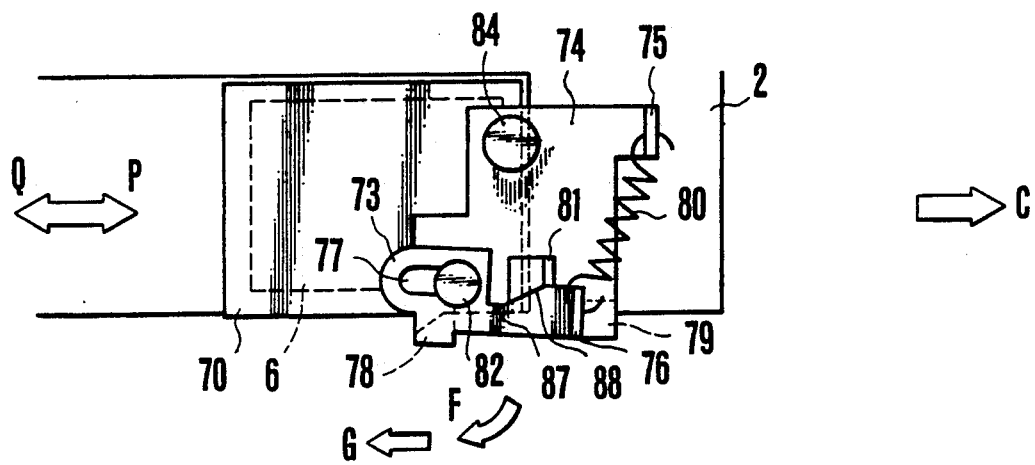

Referring now to FIG. 5C, the shutter closing operation is as follows: With the closing claw 78 in the state of having entered into the shutter closing hole 71 of the shutter 70, when the cassette 2 is pulled out by hand in the direction reverse to the direction of arrow C, the closing claw 78 comes to abut on the end face 71a of the shutter closing hole 71. Then, with the cassette 2 pulled out further in the direction reverse to the direction of arrow C, the closing claw 78 moves the shutter 70 in the direction of arrow P. The openings 6 and 6' are thus closed by the shutter 70.

With the openings 6 and 6' in a state of having been completely closed, when the cassette 2 is pulled out further in the direction reverse to the direction of arrow C, since the closing claw 78 is abutting on the end face 71a of the shutter closing hole 71, the closing member 73 slides in the direction of arrow G relative to the opening member 74 against the urging force of the spring 80 within the length of the slot 77 having the guide pin 82 fitted therein. This causes the cam part 88 of the closing member 73 to engage the bent part 81 of the opening member 74. Therefore, the closing member 73 turns on the guide pin 82 in the direction of arrow F against the urging force of the spring 80. This brings the closing claw 78 away from the closing hole 71 of the shutter 70.

Figure 6A:
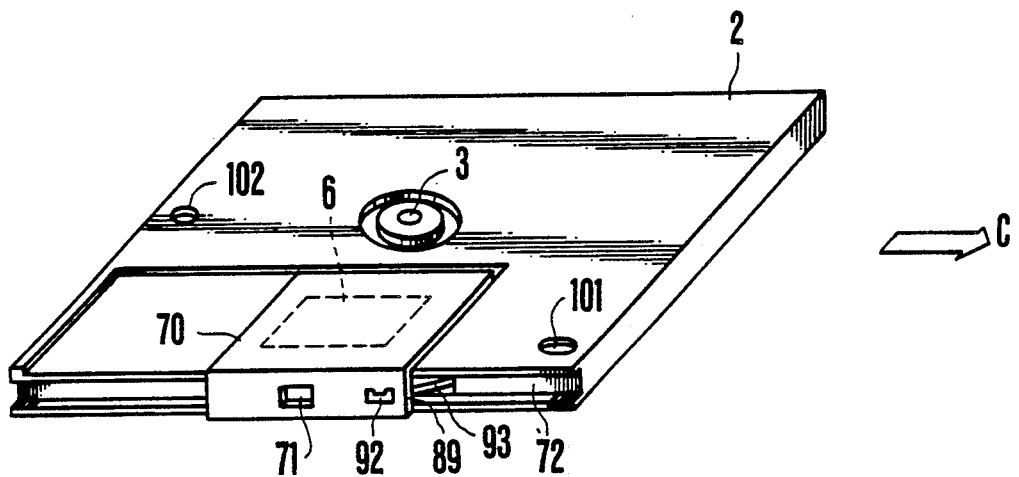
FIGS. 6A–6D show the details of the cassette, FIG. 6A being an oblique view of the cassette.

Next, referring to FIGS. 6A-6D, a shutter lock member which is provided on the cassette 2 is arranged as follows: As shown in FIG. 6A, one side of the shutter 70 is provided with an engaging claw 92 which is arranged to engage a recessed part 95 of the lock member 93. The shutter lock member 93 is made of a synthetic resin material and is disposed in the groove 72 formed along the side of the cassette 2 and stowed within the recessed part 94 provided in the cassette 2.

When the cassette 2 which is arranged as described above is inserted into the cassette holder 7 in the direction of arrow C, the closing claw 78 of the closing member 73 and the opening claw 79 of the opening member 74 come in the groove 72 of the cassette 2 to slide there.

Figure 6B:
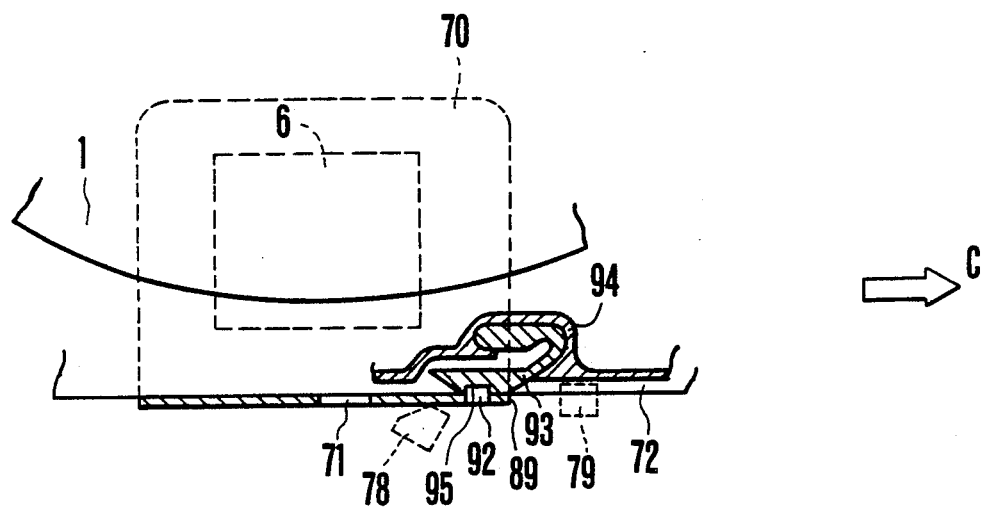

The state of the shutter lock member before the shutter 70 is open is as shown in FIG. 6B. The engaging claw 92 disposed on one side of the shutter 70 engages the recessed part 95 of the shutter lock member 93 to inhibit thereby the shutter 70 from being opened. The closing claw 78 and the opening claw 79 which are in the groove 72 of the cassette 2 slide the inside of the groove 72. Then, the closing claw 78 first comes to engage the shutter lock member 93 at its tapered part. This causes the closing member 73 to turn in the direction of arrow F against the force of the spring 80 as shown in FIG. 5A. The closing claw 78, therefore, rides on the side face of the shutter 70 to come to a position as indicated by a broken line in FIG. 6B. At that instant, the opening claw 79 is located before the shutter lock member 93.

Figure 6C:
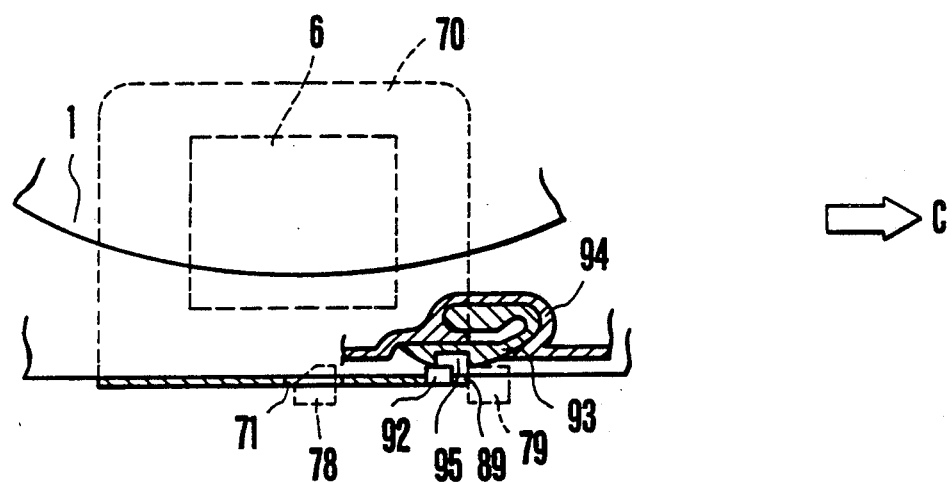

FIG. 6C shows a condition immediately after commencement of a shutter opening operation. The closing claw 78 which has been in the position as shown in FIG. 6B then slides on the side face of the shutter 70 and to enter into the shutter closing hole 71. At that time, the opening claw 79 pushes the shutter lock member 93 to disengage the engaging claw 92 and the recessed part 95 from each other. The end face of the opening claw 79 abuts on the end face 89 of the shutter 70 to open the shutter 70 by retaining the shutter 70 while the cassette 2 is further inserted in the direction of arrow C.

Figure 6D:
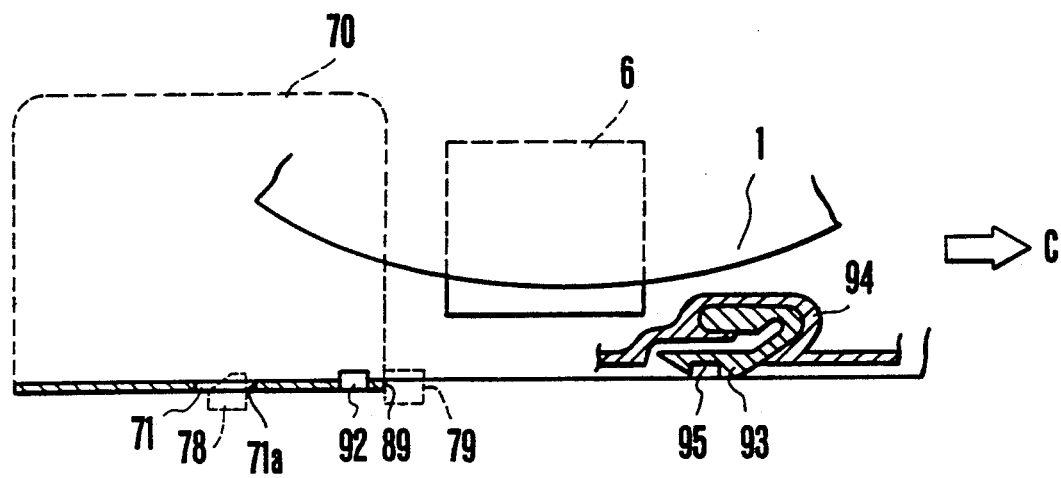

FIG. 6D shows a condition after completion of the shutter opening operation. With the shutter 70 having been opened, the stabilizer inserting opening 6 and the magnetic head inserting opening 6' of the cassette 2 are exposed.

Next, when the cassette 2 is moved in the direction reverse to the direction of arrow C under the condition shown in FIG. 6D for taking out the cassette 2, the closing claw 78 which has been in the closing hole 71 of the shutter 70 comes to abut on the end face 71a of the hole 71. The closing claw 78 thus detains the shutter 70 while the cassette 2 is moved in the direction reverse to the direction of arrow C, so that the shutter 70 can be closed (see FIG. 6C). With the shutter 70 having been completely closed, the engaging claw 92 of the shutter 70 engages the recessed part 95 of the lock member 93 to keep the shutter 70 in the closed state. Then, with the cassette 2 moved further in the direction reverse to the direction of arrow C, the cam part 88 of the closing member 73 engages the bent part 81 of the opening member 74 to cause the closing member 73 to turn in the direction of arrow F as described in the foregoing (FIG. 5C). Then, this disengages the closing claw 78 from the closing hole 71 (see FIG. 6B).

Figure 7A:
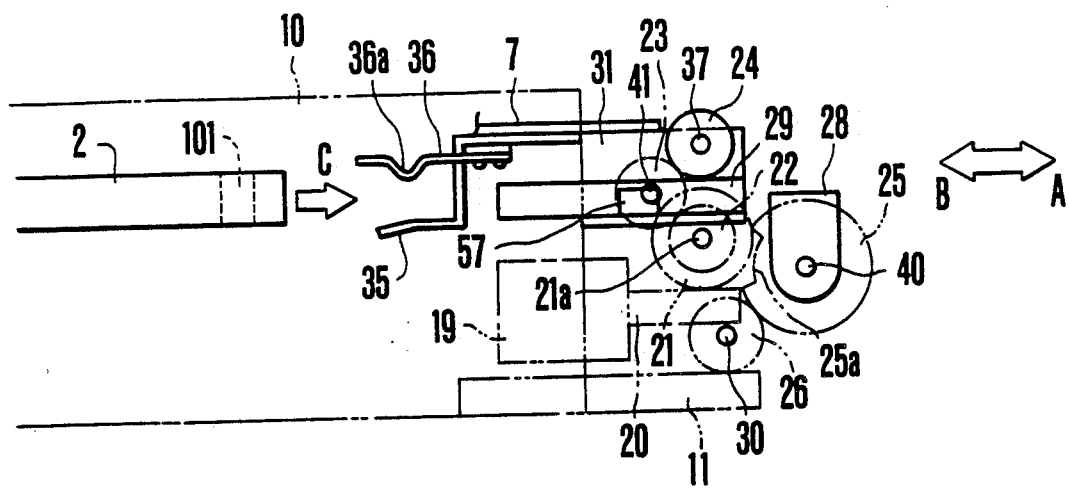
FIG. 7A is a side view showing a cassette and a gear arrangement of the embodiment as in a state before the cassette is inserted.
Figure 7B:
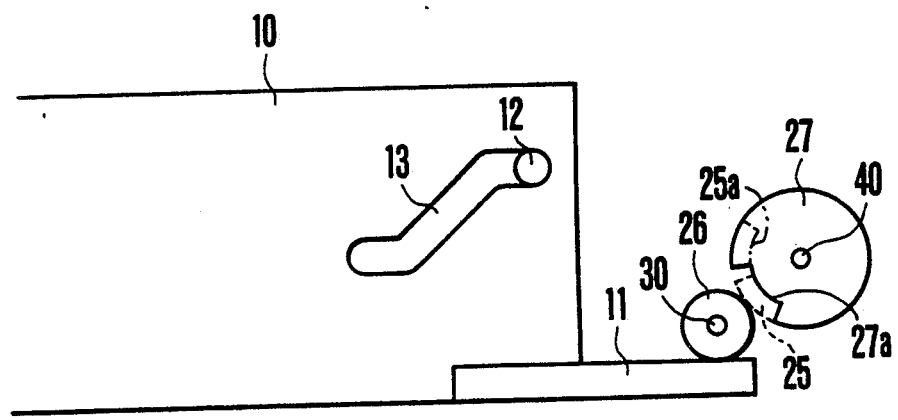
FIG. 7B is a side view showing engagement between a part of a second toothless gear and a gear train of the gear arrangement when the cassette is inserted.
Figure 8:
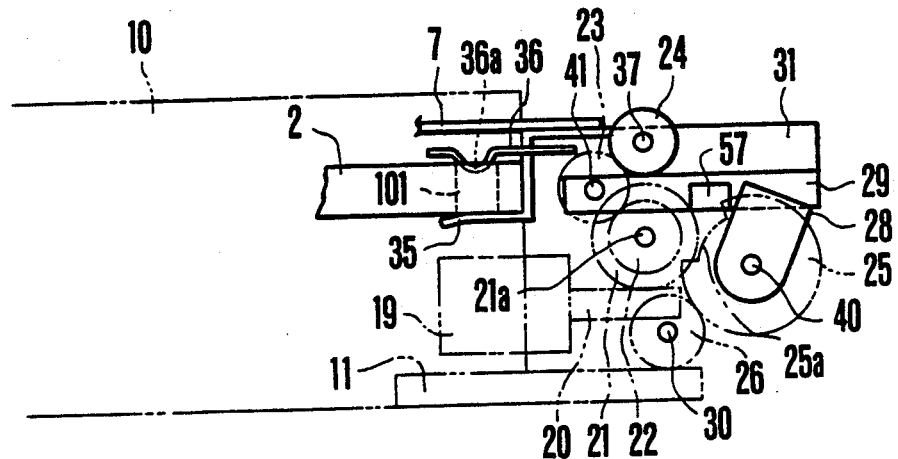
FIG. 8 is a side view showing the cassette inserted and the gear arrangement in driving operation.

FIGS. 7A, 7B and 8 show the operation of the gear mechanism in the cassette loading device. The cassette 2 is inserted from the direction of arrow C into the cassette holder 7 as shown in FIG. 7A. The fore end of the cassette 2 is sandwiched in between the leaf spring 34 and the cassette receiving part 35 provided on pull-in and eject member 31. Then, the cassette 2 is manually pushed further in the direction of arrow A. At that time, the engaging member 36 engages at its engaging part 36a with the positioning hole 101 of the cassette 2. The loading motor 19 has not yet been started at that time. Thus, the lever 57 which is provided on one side of the rack 29 of the pull-in and eject member 31 is in a position as shown in FIG. 7A. Therefore, the lever 28 which is coaxially connected to the first toothless gear 25 is also in a position shown in FIG. 7A. Accordingly, the toothless part 25a of the first toothless gear 25 is confronting the gear 22 and the gear 22 is not engaging with the first toothless gear 25.

As for the second toothless gear 27, the toothless part 27a thereof is also confronting the gear 26 as shown in FIG. 7B. Therefore, the gear 26 is not engaging with the second toothless gear 27. Since the loading motor 19 has not been started as yet, the slide plate 10 does not slide. The pins 12 and 12' which are protruding from the side face of the cassette holder 7 are thus located in the upper parts of the cam slots 13.

With the fore end of the cassette 2 sandwiched in between the leaf spring 34 and the cassette receiving part 35 of the pull-in and eject member 31 as shown in FIG. 7A, when the cassette 2 is further manually pushed in the direction of arrow A, this pushing acting causes the pull-in and eject member 31 to slide in the direction of arrow A. And the rack 29 also moves in the direction of arrow A. Then, since the gear unit 24 with which engages with the rack 29 is provided with the one-way clutch, no rotating torque is applied to the gear 23. When the pull-in and eject member 31 is moved to slide to a predetermined position, a cassette insertion detecting switch (which will be described later with reference to FIG. 12) operates to cause the loading motor 19 to start rotating When the loading motor 19 rotates in the normal direction, its rotation torque is applied to the gear 23 via the worm gear 20 and the worm wheel 21. The gear 23 rotates clockwise. The clockwise rotation of the gear 23 causes the gear unit 24 to rotate counterclockwise. Then, the one-way clutch provided within the gear unit 24 transmits the counterclockwise rotation of the gear unit 24 to the rack 29. This moves the pull-in and eject member 31 via the rack 29 further in the direction of arrow A. At that time, the cassette 2 is pulled into the cassette holder 7 by the engaging member 36 provided on the pull-in and eject member 31 in the same direction.

On the other hand, the lever 57 which is disposed on one side of the rack 29 also moves in the direction of arrow A and comes to abut on the lever 28 and to turn it clockwise. This causes the first and second toothless gears 25 and 27 to rotate clockwise. The first toothless gear 25 then engages with the gear 22. The gear 22 causes the first toothless gear 25 to rotate clockwise. When the first toothless gear 25 is rotated clockwise, the second toothless gear 27 is also caused to rotate clockwise and to engage with the gear 26. Therefore, the rotation torque of the loading motor 19 is transmitted to the rack 11 via the worm gear 20, the worm wheel 21, the gear 22, the first and second toothless gears 25 and 27 and the gear 26, and is further transmitted to the rack 11' via the gear 26'. As a result, the slide plates 10 and 10' begin to slide in the direction of arrow A.

The above described cassette pull-in completion condition is shown in FIG. 8.

FIG. 9 shows further details of the disc stabilizer 44 and the center core pressing member 46. The sliding action of the slide plate 10 in the direction of arrow A causes through its cam slot 18 the stabilizer 44 to descend from its initial position indicated by a two-dot chain line to a position indicated by a full line along a guide shaft 45. Following this downward movement of the stabilizer 44, the detection yoke 42 and the detection coil 52 which form a pulse generator and are attached to the support arm 43 also come down to confront the PG pin 4 of the center core 3 of the disc 1.

The center core pressing member 46 turns in the direction of arrow D on the turning center shaft 47 as shown in FIG. 9, since the pin 48 moves from the right-hand side low lift face 49a to the middle high lift face 49b of the slide cam 49 as the cam 49 moves in the direction of arrow A in FIG. 2. The fore end 46a of the center core pressing member 46 then exerts a pushing force on the center core 3 to forcedly mount the core 3 onto the spindle 53. Then, with the slide cam 49 further moving in the direction of arrow A in FIG. 2, the pin 48 is placed on the left low lift face 49c of the cam 49. Therefore, the center core pressing member 46 is brought back to its original position as shown by the two-dot chain line by the spring 50. With the slide cam 49 thus provided with the low lift face 49c on the left side of the high lift face 49b formed in the middle thereof, the center core pressing member 46 can be kept in a state of being uplifted from its position indicated by the full line. Therefore, the center core pressing member 46 never imposes any load on the rotation of the magnetic disc 1. Further, in this case, the slide cam 49 is arranged to actuate the center core pressing member 46 during a remaining portion of the sliding stroke of the slide plate 10' which takes place after the cassette holder 7 has moved down to the cassette loading position, or a second position. A magnet 55 is provided on the spindle 53 for exerting a magnetic attraction on a soft magnetizable member (not shown) which is buried in the center core 3, so that the mounting and positioning action on the center core 3 can be facilitated.

Figure 10:
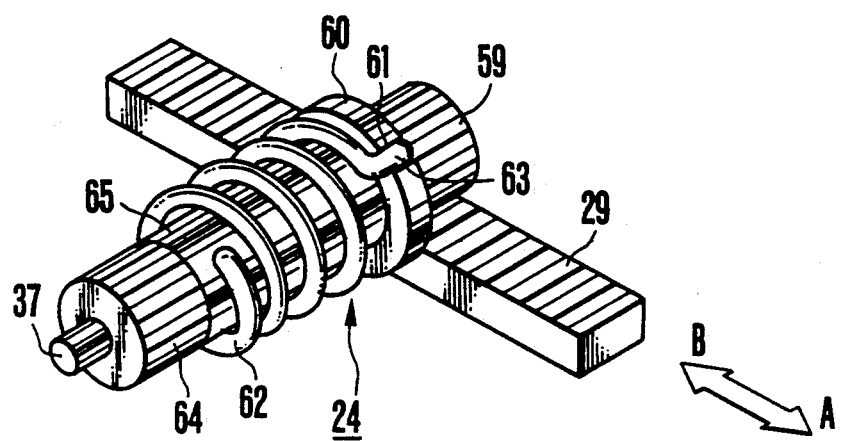
FIG. 10 is an oblique view showing a one-way clutch provided in a gear unit of the embodiment.

FIG. 10 shows, by way of example, the arrangement of the gear unit 24 which is provided with the one-way clutch A gear 59 is arranged to engage with the rack 29. A flange 60 which has a notch 61 is formed in one unified body with the gear 59. A coiled spring 62 has a bent part 63 fitted in the notch 61 of the flange 60 A gear 64 is arranged to transmit a driving force and engages with the gear 23 as shown in FIG. 8. A cylindrical part 65 is formed in one unified body with the gear 64. The gear shaft 37 is arranged to have the gear unit 24 which is arranged in this manner carried by the chassis 51 as shown in FIG. 2.

The gear unit 24 operates in the following manner:

When the cassette 2 is manually inserted, the rack 29 moves in the direction of arrow A together with the pull-in and eject member 31. This causes the gear 59 to rotate counterclockwise on the gear shaft 37. At the same time, the flange 60 which is formed in one unified body with the gear 59 also rotates counterclockwise. Accordingly, the coiled spring 62 which has its bent part 63 fitted in the notch part 61 also rotates counterclockwise. However, since this rotating direction of the coiled spring 62 enlarges the inner diameter thereof, the rotation torque is not transmitted to the gear 64 and the cylindrical part 65 which is formed in one unified body with the gear 64. Therefore, the gear 59, the flange 60 and the coiled spring 62 rotate in vain.

Next, when a rotation torque is given to the gear 64 from the gear 23 and the gear 64 rotates counterclockwise, the cylindrical part 65 also rotates counterclockwise. This counterclockwise rotation of the cylindrical part 65 takes place in such a way as to cause the coiled spring 62 to be wound around the cylindrical part 65. Then, a frictional force is exerted between the coiled spring 62 and the cylindrical part 65 and the inner diameter of the former becomes smaller to have the coiled spring 62 tightly wound around the cylindrical part 65. Then, a driving force is transmitted to the rack 29 via the coiled spring 62, the bent part 63, the notch part 61, the flange 60 and the gear 59. This driving force causes the rack 29 to move in the direction of arrow A.

In ejecting the cassette 2, the gear 64 receives a rotation torque from the gear 23 and rotates clockwise. This rotating direction enlarges the inner diameter of the coiled spring 62. Here, it must be noted that, although the one-way clutch is arranged so that it transmits a driving torque only for rotation in one direction and not for rotation in the reverse direction, it is arranged to be capable of transmitting a driving torque also for reverse rotation if a load imposed on the gear which is receiving the driving force is larger than a load on the gear disposed on the idle rotation side. Therefore, the rack 29 can be shifted in the direction of arrow B with an idle rotation torque brought about by arranging a load which is imposed on the side of the gear 64 by the gear train consisting of the gears 23 and 22, the worm wheel 21, the worm gear 20 and the first and second toothless gears 25 and 27 to be larger than a load imposed by some frictional force between the coiled spring 62 and the cylindrical part 65, the weight of the cassette 2 on the rack 29, a frictional force between the pull-in and eject member 31 and the cassette holder 7, etc.

Figure 11:
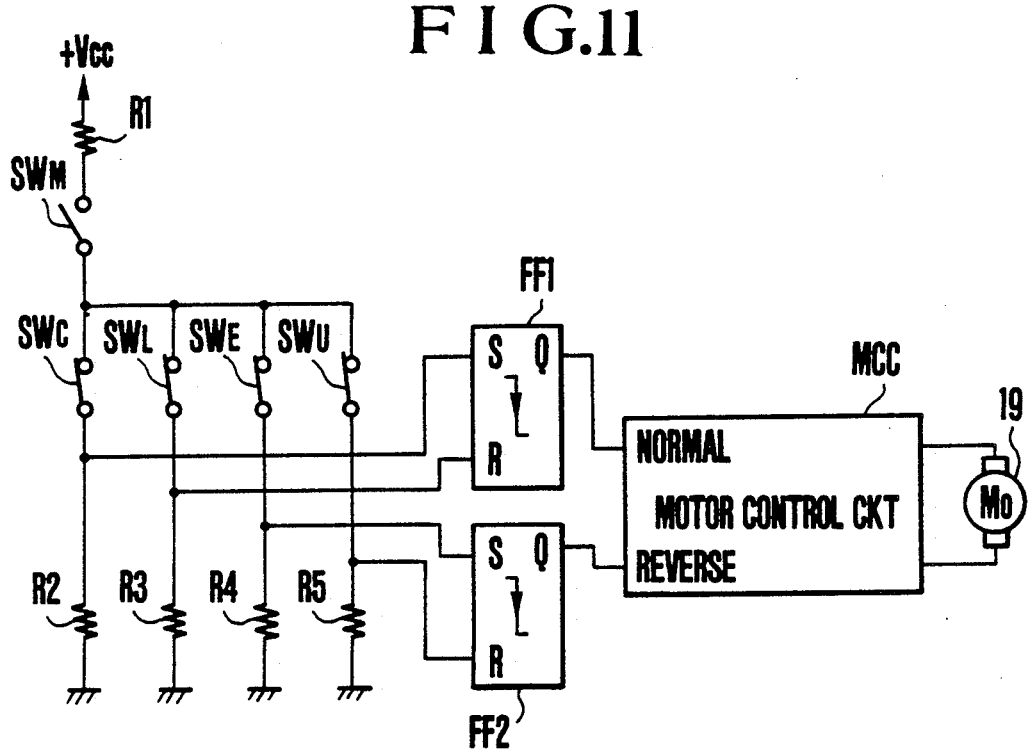
FIG. 11 is a circuit diagram showing the circuit arrangement of a control circuit provided for a loading motor to be used for cassette loading and ejecting operations.

FIG. 11 shows, by way of example, a control circuit for the loading motor 19 which is provided for loading and ejecting the cassette 2 mentioned in the foregoing.

Referring to FIG. 11, SWH denotes a main switch which is connected via a resistor R1 to a power source +Vcc. SWC denotes a type cassette insertion detecting switch which is disposed, for example, at a part of the cassette holder 7. This detecting switch SWC is arranged to be opened by the pull-in and eject member 31 when the member 31 slides to a predetermined position in the direction of arrow A is shown in FIG. 8. The switch SWC is connected in series with the main switch SWM together with a resistor R2. SWL denotes a normally closed type cassette loading completion detecting switch which is arranged, as shown in FIGS. 1 and 2, for example, to be opened by the slide plate 10' when the slide plate 10' comes to an end of its sliding action in the direction of arrow A. The switch SWL is connected in series with the main switch SWM together with a resistor R3. SWE denotes a normally closed type ejection switch SWE which is arranged to be opened by the operation of an eject key (not shown) The switch SWE is connected in series with the main switch SWM together with a resistor R4. SWU denotes a cassette ejection completion detecting switch which is disposed, for example, at a part of the cassette holder 7. This detecting switch SWU is arranged to be opened by the pull-in and eject member 31 when the member 31 slides to a predetermined position in the direction of arrow B as shown in FIGS. 1, 2 and 7A. The cassette ejection completion detecting switch SWU is connected in series with the main switch SWM together with a resistor R5. FF1 denotes a first fall-synchronizing type RS flip-flop which is arranged to be set by a shift of a potential at a connection point between the cassette insertion detecting switch SWC and the resistor R2 from a high level to a low level and, after that, to be reset by a shift of a potential at a connection point between the cassette loading completion detecting switch SWL and the resistor R3 from a high level to a low level FF2 denotes a second fall-synchronizing type RS flip-flop which is arranged to be set by a shift of a potential at a connection point between the ejection switch SWE and the resistor R4 from a high level to a low level and, after that, to be reset by a shift of a potential at a connection point between the cassette ejection completion detecting switch SWU and the resistor R5 from a high level to a low level. MCC denotes a motor control circuit which is arranged to cause the loading motor 19 to rotate in the normal direction (to rotate clockwise in the case of the above-stated example) for loading the cassette 2 in response to the high level of the output Q of the first flip-flop FF1 and to cause, in response to the high level of the output Q of the second flip-flop FF2, the motor 19 to rotate in the reverse direction (rotate counterclockwise). The motor control circuit MCC brings the loading motor 19 to a stop in response to the low level of the outputs Q of the first flip-flop FF1 and the second flip-flop FF2.

With the circuitry arranged as described above, in loading the apparatus with the cassette 2, the cassette is inserted after the main switch SWM is closed. When the cassette 2 is pushed in to a certain extent, the pulling and eject member 31 slides in the direction of arrow, A. And then, when the pull-in and eject member 31 slides the predetermined position in the direction of arrow B, the cassette insertion detecting switch SWC is opened and the first flip-flop FF1 is set. Accordingly the level of the output Q of the first flip-flop FF1 becomes high, and thereby the motor control circuit MCC causes the loading motor 19 to rotate in the normal direction for the cassette loading. Then, the various actions which have been described in the foregoing are performed for the cassette loading. Upon completion of the cassette loading operation, the slide plate 10' reaches the end point of its sliding action in the direction of arrow A and the cassette loading completion detecting switch SWL is opened Accordingly, the first flip-flop FF1 is reset and thereby the level of the output Q of the first flip-flop FF1 becomes low. Thus, the motor control circuit MCC brings the rotation of the motor 19 to a stop.

In ejecting the cassette 2, the eject key (not shown) is operated to open the ejection switch SWE With the switch SWE opened, the second flip-flop FF2 is set and the level of its output Q becomes high. In response to this, the motor control circuit MCC causes the loading motor 19 to rotate in the reverse direction for ejecting the cassette 2. Various actions are then performed for ejecting the cassette 2 as described in the foregoing. At the end of the cassette ejecting operation, the pull-in and eject member 31 slides in the direction of arrow B. And then, when the pulling and eject member 31 slides to the predetermined position in the direction of arrow B and a part of the cassette 2 comes to protrude from the outside of the recording and/or reproducing apparatus, the cassette ejection completion detecting switch SWU is opened to reset the second flip-flop FF2. Accordingly, the level of the output Q of the second flip-flop FF2 becomes low and thereby the motor control circuit MCC brings the reverse rotation of the loading motor 19 to a stop.

Figure 12:
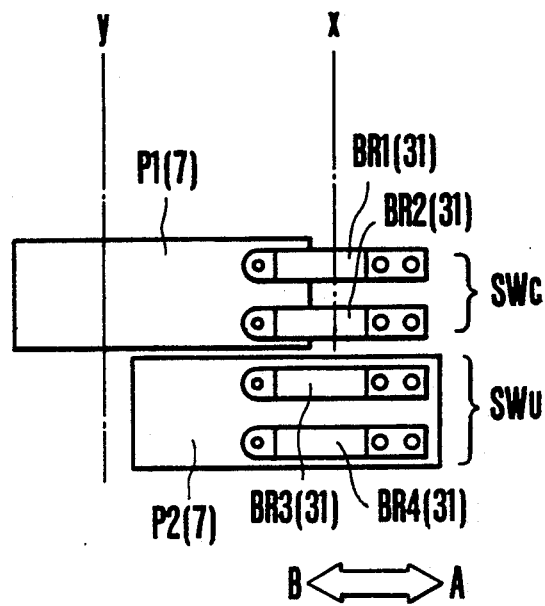
FIG. 12 is an illustration of an arrangement of a cassette insertion detecting switch and a cassette ejection completion detecting switch of the embodiment.
Figure 13A:
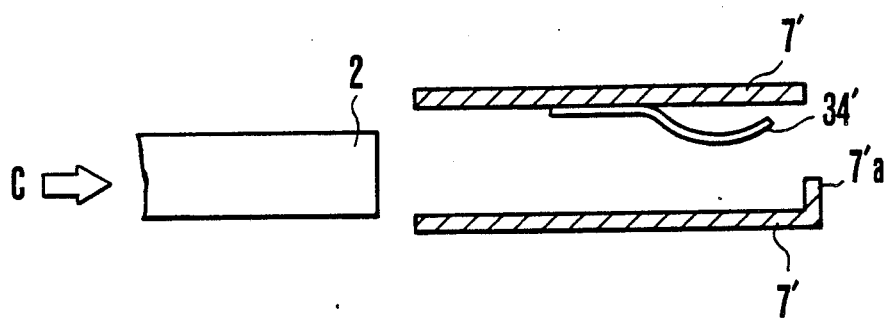
FIGS. 13A and 13B are illustrations of the cassette inserting operation in an example of the conventional device.
Figure 13B:
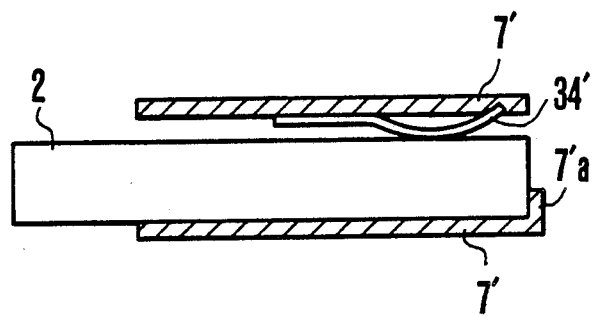

FIG. 12 shows, by way of example, the specific arrangement of the above-stated switches SWC and SWU. In the drawing, they are shown as viewed from the lower side of the cassette holder 7. The backside of the upper surface, i.e. the ceiling, of the cassette holder 7 is provided with conductor patterns P1 and P2. The conductor patterns P1 and P2 are arranged on a part covered with an insulator member. On the other hand, sliding brushes BR1–BR4 are secured to the pull-in and eject member 31 by means of some fixing members such as screws or the like. In this case, these brushes BR1-BR4 are arranged on a part of the member 31 covered with an insulator member. The brushes BR1 and BR2 form the switch SWC and the brushes BR3 and BR4 the switch SWU. A reference symbol "x" indicates a cassette ejection completion point and a symbol "y" indicates a cassette manual insertion completion point. With the switches SWC and SWU arranged in this manner, the brushes BR1-BR4 slide according as the pull-in and eject member 31 slides in the direction of arrow A or B. In the case of sliding in the direction of arrow A, the switch SWC is opened at the manual insertion completion point "y". In the case of sliding in the direction of arrow B, the switch SWU is opened at the ejection completion point "x". These switches SWC and SWU may be conversely arranged by having the brushes BR1-BR4 attached to the ceiling of the cassette holder 7 and the conductor patterns P1 and P2 formed on the pull-in and eject member 31.

The operation of the whole device in loading the apparatus with the cassette 2 is as follows: When the cassette 2 is inserted into the cassette holder 7 from the direction of arrow C as shown in FIGS. 1 and 2, the closing claw 78 of the closing member 73 and the opening claw 79 of the opening member 74 enter into the groove 72 of the cassette 2. Then, with the cassette 2 further inserted, the closing claw 78 comes to abut on the shutter lock member 93 and the end face 89 of the shutter 70. This causes the closing member 73 to turn about the guide pin 82 against the urging force of the spring 80 as shown in FIG. 5A in the direction of arrow F. Accordingly, the closing claw 78 moves over the end face 89 of the shutter 70 to slide on the side face of the shutter 70 (FIG. 6B). The closing claw 78 then enters into the shutter closing hole 71 (FIG. 5B and FIG. 6C). At that time, the pushing action of the opening claw 79 unlocks the shutter lock member 93. Then, with the cassette 2 pushed further in the direction of arrow A, the opening claw 79 pushes the shutter 70 to slide it in the direction of arrow Q. The shutter 70 is thus opened (FIG. 6D).

After that, when the cassette 2 is further pushed in to have the fore end part thereof pinched between the leaf spring 34 and the cassette receiving part 35 of the cassette pull-in and eject member 31, the engaging part 36a of the engaging member 36 engages the positioning hole 12 of the cassette 2. When the cassette 2 is still further pushed in under this condition, the cassette pull-in and eject member 31 is caused to slide in the direction of arrow A along the slot 33 which is engaging with the pin 32 planted on the cassette holder 7. The rack 29 which is secured to the cassette pull-in and eject member 31 also moves in the direction of arrow A. With the rack moving in the direction of arrow A, the gear 59 which engages the rack 29 as shown in FIG. 10 rotates counterclockwise. At the same time, the flange 60 which is formed in one unified body with the gear 59 also rotates counterclockwise. The coiled spring 61 which engages the notch part 61 then also rotates counterclockwise. Since this rotating direction causes the inner diameter of the coiled spring 62 to increase, no rotation torque is transmitted to the gear 64 and the cylindrical part 65 which is formed in one unified body with the gear 64. The gear 59, the flange 60 and the coiled spring 62 thus idly rotate to transmit no driving torque to the gear 23. With the cassette pull-in and eject member 31 pushed in further in the direction of arrow A, when it comes to a predetermined position, the cassette insertion detecting switch SWC which is shown in FIGS. 11 and 12 is opened. The first flip-flop FF1 is set. The level of the Q output of the flip-flop FF1 becomes high. The control circuit MCC then causes the loading motor 19 to begin to rotate clockwise. With the motor 19 thus rotated, a rotation torque is transmitted to the gear unit 24 to rotate the same in the counterclockwise direction through the worm gear 20, the worm wheel 21 and the gears 22 and 23. With regard to the gear unit 24, as has been described with reference to FIG. 10, the cylindrical part 65 which is formed in one unified body with the gear 64 rotates counterclockwise when the gear 64 is rotated counterclockwise. This is because the coiled spring 62 is wound tighter around the cylindrical part 65 as it rotates in a state wound around the cylindrical part 65. The gear unit 24, therefore, causes the rack 29 to continuously move in the direction of arrow A through the coiled spring 62, the bent part 63, the notch part 61, the flange 60 and the gear 59. This causes the cassette pull-in and eject member 31 to slide in the direction of arrow A along the slot 33 with which the pin 32 is slidably engaged. Then, since the positioning hole 101 is engaging the engaging part 36a of the engaging member 36, the cassette 2 is pulled and moved in the same direction into the cassette holder 7.

In their initial positions, the first and second toothless gears 25 and 27 are caused by a spring and a positioning member (not shown) to have their toothless parts respectively opposed to gears 22 and 26 (FIGS. 7A and 7B). Therefore, the first and second toothless gears 25 and 27 do not rotate when the gear 22 rotates The lever 57 also moves in the direction of arrow A according as the rack 29 moves in the direction of arrow A. The lever 57 thus comes to abut on the lever 28 to cause the latter to turn clockwise as shown in FIG. 8. Both the first and second toothless gears 25 and 27 which are coaxially coupled with the lever 28 rotate clockwise. Then, the first toothless gear 25 first comes to engage the gear 22 which is rotating counterclockwise. This causes the first toothless gear 25 to rotate clockwise. The clockwise rotation of the first toothless gear 25 causes the second toothless gear 27 to rotate further clockwise and to engage the gear 26. The gear 26 then rotates counterclockwise to move the rack 11 in the direction of arrow A. With the rack 11 thus moved, the slide plate 10 moves in the direction of arrow A. The rotation torque of the gear 26 is transmitted via the rotation shaft 30 to the gear 26' which engages the rack 11' of the other slide plate 10'. The slide plate 10', therefore, also slides in the direction of arrow A. The slide cam 49 is also moved in the direction of arrow A.

The pins 12 and 12' which are disposed on the sides of the cassette holder 7 move downward being guided by the cam slots 13 which are provided respectively in the slide plates 10 and 10'. Accordingly, the cassette holder 7 begins to move downward.

The cassette pull-in and eject member 31 also moves downward together with the cassette holder 7. Thus, the rack 29, at the same time, begins to descend. The descent of the rack 29 disengages it from the gear unit 24, and thereby the cassette pull-in and eject member 31 stops sliding in the direction of arrow A. The rack 11 continues to receive the rotation torque of the loading motor 19 via the worm gear 20, the worm wheel 21, the gear 22, the first and second toothless gears 25 and 27 and the gear 26. Therefore, the slide plate 10 continues to move in the direction of arrow A. Accordingly, the cassette holder 7 also continues to descend. The descent of the holder 7 comes to a stop when it reaches the cassette loading completing position (or the second position thereof).

In this instance, as shown in FIG. 9, the cassette 2 which is carried by the cassette holder 7 comes to have its position restrictively defined by the positioning member 58a disposed on the chassis base plate 58 with the lower side of the cassette coming to abut on the positioning member 58a a little before the cassette holder 7 reaches the final lowered position thereof as shown in FIG. 9. At that time, the over-stroke of the cassette holder 7 causes the leaf spring 34 of the cassette pull-in and eject member 31 and a leaf spring (not shown) which is disposed within the holder 7 to urge and press the cassette 2. In this case, the shutter opening member 74 is mounted on the cassette holder 7 to be vertically swingable by means of the pin 84 through the coiled spring 83 as mentioned in the foregoing. Therefore, when the cassette holder 7 further descends after the cassette 2 is restrictively defined by the positioning member 58a, the closing claw 78 comes into contact with the lower edge face 86 of the shutter closing hole 71 of the shutter 70 and the opening claw 79 into contact with the edge face 85 of the groove 72 and thereby the shutter opening member 74 moves upward relative to the cassette holder 7 against the force of the spring 83. Thus, the fear of the damages of the parts 78, 79, 85 and 86 is eliminated.

With the rotation torque of the loading motor 19 transmitted to the gear 26 via the worm gear 20, the worm wheel 21, the gear 22 and the first and second toothless gears 25 and 27, the rotation torque of the gear 26 is imparted to the gear 26' via the rotation shaft 30. The rack 11' and, accordingly, the slide plate 10' are caused to move in the direction of arrow A. This causes the slide cam 49 which is secured to the side face of the slide plate 10' to move also in the direction of arrow A. When the pin 48 of the center core pressing member 46 which is abutting on the low lift face 49a of the slide cam 49 comes to the high lift face 49b of the cam 49, the center core pressing member 46 turns in the direction of arrow D on the center shaft 47. The center core pressing member 46 thus comes to a position indicated by a full line from a position indicated by a two-dot chain line in FIG. 9. The fore end pressing part 46a of the member 46 then applies a pushing force to the center core 3. The center core 3 is thus mounted with pressure on the spindle 53 of the disc rotating motor 54. With the slide plate 10' moved further in the direction of arrow A, the pin 48 comes to another low lift face 49c of the cam 49. Then, this causes the center core pressing member 46 to turn in the direction of arrow E to come back to the position indicated by the two-dot chain line in FIG. 9.

During the descent of the cassette holder 7, the disc stabilizer 44 moves down from the position shown by a two-dot chain line to a position shown by a full line in FIG. 9 being guided by the guide shaft 45 through the cam slot 18 provided in the slide plate 10. In this manner, the disc stabilizer comes to closely confront the upper surface of the magnetic disc 1 to stabilize the magnetic disc 1 relative to the magnetic head 56 when the disc 1 is rotated.

When the slide plates 10 and 10' come to the end of their sliding motions in the direction of arrow A through the processes described above, the slide plate 10' opens the cassette loading completion detecting switch SWL. With the switch SWL opened, the first flip-flop FF1 is reset. The level of the Q output of the flip-flop FF1 becomes low. The motor control circuit MCC then brings the normal rotation of the loading motor 19 to a stop.

Then, the disc rotating motor 54 is started to rotate the magnetic disc 1. The magnetic head 56 then performs a signal recording or reproducing operation.

During the recording or reproducing operation, a known head shifting device either continuously or intermittently shifts the magnetic head 56 through a head carriage 97 as shown in FIG. 9 in the direction of arrow L or M, which is a radial direction of the disc 1.

Next, the cassette ejecting operation of the embodiment is described as follows:

When an eject key or the like (not shown) is operated, the rotation of the disc rotating motor 54 which is shown in FIG. 9 comes to a stop. Then, an eject switch SWE which is shown in FIG. 11 is opened. A second flip-flop FF2 is set. The level of the Q output of the flip-flop FF2 becomes high. As a result of that, the motor control circuit MCC causes the loading motor 19 to rotate counterclockwise for ejecting the cassette 2. With the loading motor 19 rotating counterclockwise, the worm gear 20 also rotates counterclockwise. The gear 22 rotates clockwise to cause the gear 23, the first and second toothless gears 25 and 27 to rotate counterclockwise. The counterclockwise rotation of the gear 23 causes the gear unit 24 to rotate clockwise. The counterclockwise rotation of the second toothless gear 27 is transmitted to the gear 26. The gear 26 rotates clockwise. The clockwise rotation of the gears 26 and 26' causes the racks 11 and 11' to begin to move in the direction of arrow B. The slide plates 10 and 10' likewise begin to slide in the direction of arrow B.

The cam 49 then moves in the direction of arrow B to change the location of the pin 48 from the low lift face 49c to the high lift face 49b of the cam 49. Therefore, the center core pressing member 46 turns in the direction of arrow D from its position indicated by the two-dot chain line to the position indicated by a full line in FIG. 9. With the cam 49 continuing to move further in the direction of arrow B, the pin 48 comes to the low lift face 49a of the slide cam 49 to bring the center core pressing member 46 back to the position indicated by the two-dot chain line. The pin 12 which is planted on the side face of the cassette holder 7 and the pin 17 which is planted on the side face of the stabilizer 44 are guided to move upward by the cam slots 13 and 18 provided in the slide plate 10. This causes the cassette holder 7 and the stabilizer 44 to move upward.

With the slide plates 10 and 10' sliding in the direction of arrow B in this manner, the center core pressing member 46 comes back to the initial position and, after that, the cassette holder 7 and the stabilizer 44 move upward back to their initial positions. Upon their return to the initial positions, the toothless part of the second toothless gear 27 confronts the gear 26 to disengage the second toothless gear 27 from the gear 26. The transmission of the driving torque to the gear 26 is thus cut off. Accordingly, the sliding motions of the slide plates 10 and 10' come to a stop.

The ascent of the cassette holder 7 causes the cassette pull-in and eject member 31 to move upward. The rack 29 again engages the gear unit 24. Since the gear unit 24 is rotating clockwise reversely to the direction taken at the time of descent of the cassette holder 7, the rack 29 is moved in the direction of arrow B.

As mentioned in the foregoing, the first toothless gear 25 remains engaged with the gear 22 even after the second toothless gear 27 disengages from the gear 26. Therefore, the gear 22 which is rotating clockwise causes the first and second toothless gears 25 and 27 and the lever 28 to rotate and turn counterclockwise. The toothless part of the first toothless gear 25 then comes to confront the gear 22 to disengage the gear 25 from the gear 22. The transmission of the driving force to the first toothless gear 25 is thus cut off. Then, a spring and a positioning member (not shown) bring the first and second toothless gears 25 and 27 and the lever 28 back to their initial positions shown in FIGS. 7A and 7B.

Since the loading motor 19 is still rotating, the gear unit 24 moves the rack 29 further in the direction of arrow B. The cassette pull-in and eject member 31 also slides in the direction of arrow B. When the cassette 2 is thrusted to a sufficient extent from the outside of the front panel of the recording and/or reproducing apparatus (not shown), the cassette ejection completion detecting switch SWU which is shown in FIGS. 11 and 12 is opened, and thereby the second flip-flop FF2 is then reset. Thus, the level of the Q output of the flip-flop FF2 becomes low. Therefore, the motor control circuit MCC brings the rotation of the loading motor 19 to a stop. The ejecting operation on the cassette 2 then comes to an end.

Under this condition, as mentioned in the foregoing, the closing claw 78 of the closing member 73 is in the shutter closing hole 71 of the shutter 70 which is attached to the cassette 2. Therefore, with the cassette 2 taken out in the direction of arrow B as mentioned above, the shutter 70 is closed as the closing claw 78 moves the shutter 70 in the direction of arrow P relative to the cassette 2. With the shutter 70 closed, the recessed part 95 of the shutter lock member 93 comes to engage the engaging claw 92 of the shutter 70 to lock the shutter 70 in the closed state.

When the cassette 2 is moved further in the direction of arrow B, the shutter closing member 73 is guided to move in the direction of arrow G by the guide pin 82 which is located within the slot 77 as the closing claw 78 is abutting on the end face 71a of the shutter closing hole 71 of the shutter 70 as shown in FIG. 5C. At that point of time, the closing member 73 is caused to turn in the direction of arrow F against the urging force of the spring 80 as one end of the bent part 81 of the shutter opening member 74 comes from the end part 87 to the cam part 88 thereof. As a result, the closing claw 78 disengages from the shutter closing hole 71 and comes to ride on the side face of the shutter 70 (see FIG. 6B).

Under this condition, when the cassette 2 is moved still further in the direction of arrow B, the closing claw 78 enters into the groove 72 provided along one side of the cassette 2 and then comes away from the groove 72. The cassette 2 is thus taken out from the recording and/or reproducing apparatus.

One example of embodiment of this invention is as described above. The cassette 2 which has the shutter 70 can be advantageously handled by the embodiment, because it is advantageous to utilize the positioning hole 101 disposed on the same side as the shutter 70 for engagement with the engaging member 36 provided on the cassette pull-in and eject member 31. The reason for this is that in pulling the cassette 2 which is provided with the shutter 70 into the cassette holder 7, the load on the pulling action is much larger on the side on which the shutter 70 is disposed than the other side of the cassette 2 as the shutter opening mechanism is arranged to act on the shutter 70. Thus, pulling action is arranged to be performed either solely on the side where the shutter 70 is not disposed or on the middle part of the pulling action whereby the embodiment is arranged to have the pulling action on a point on the same side as the shutter 70 to obviate the possibility of trouble, so that the pulling action can be smoothly performed. Further, in this case, the cassette 2 is arranged to be pulled in through the engagement of the engaging member 36 with the positioning hole 101 of the cassette 2 instead of using a clamping force of a leaf spring or the like. This arrangement further ensures a highly accurate pulling-in action on the cassette 2.

The arrangement of the cassette loading device according to this invention, as described in detail in the foregoing, eliminates all the shortcomings of the prior art devices described in the introductory part of this specification. The cassette can be handled with a light force without the fear of damaging it. The device according to the invention thus excels also in operability. The invention thus advantageously enables a recording and/or reproducing apparatus of the kind using a cassette of the above-stated kind to be always adequately loaded with the cassette. It is another advantage of the invented device that the device utilizes a positioning hole usually provided in the cassette so that the invention requires no substantial modification on the part of the cassette While a specific embodiment of the invention has been shown and described in detail to illustrate the application of the inventive principles, it will be understood that the invention may be embodied otherwise without departing from such principles.

What is claimed is:

1. In an apparatus using a cassette which is provided with an opening for exposing a recording medium housed in said cassette, said opening having a shutter arranged to be opened in response to loading of said cassette into said apparatus, said cassette being provided with at least one positioning hole near the shutter to position the cassette loaded in a loading position in the apparatus by engaging with a member in the apparatus, a cassette loading device comprising:

(a) holding means movably arranged to receive and hold the cassette and to load the received cassette to said loading position in said apparatus, said holding means having an opening for receiving the cassette and having a guiding member for guiding the cassette in a direction to a predetermined first position in the holding means;

(b) pull-in means for pulling the cassette inserted to the first position through the opening, in the direction from the first position to a second position in the holding means, in response to the receiving of the cassette in said first position, said pull-in means having an engaging member engageable with the positioning hole of the cassette in said first position, said pull-in means having an engaging member engageable with the positioning hole of the cassette near said shutter and pulling the cassette in the second position in the holding means with engagement of said engaging member and the positioning part, thereby loading the cassette into the apparatus; and (c) shutter opening means arranged to come into engagement with the shutter of the cassette and to open the same on the way when the cassette is pulled to the second position in said holding means under the action of said pulling means.

2. The device according to claim 1, wherein the positioning part of the cassette is a through hole; and said engaging member of said pull-in means is provided with a projected part which is engageable with the through hole of the cassette.

3. The device according to claim 2, wherein said engaging member has an elasticity.

4. The device according to claim 3, wherein said engaging member consists of a leaf spring.

5. The device according to claim 1, wherein said pull-in means is movable relative to said holding means in said first direction to pull the cassette into the holding means.

6. The device according to claim 5, wherein said pull-in means is movably supported by said holding means.

7. The device according to claim 6, wherein said engaging member of said pull-in means is arranged to engage with the positioning part of the cassette when the cassette is inserted into said holding means to a predetermined position in said first direction.

8. The device according to claim 7, wherein said holding means has a room with a ceiling wall, to receive the cassette; and said pull-in means is supported by said ceiling wall with said engaging member projected into said room.

9. The device according to claim 5, further comprising
drive means for sequentially and independently driving said pull-in means and said holding means so that the pull-in means is firstly moved to a predetermined position in said first direction to pull the cassette into the holding means and thereafter the holding means is moved in said second direction to place the cassette at said loading position.

10. The device according to claim 1, further comprising:
drive means for driving said pull-in means and said holding means, said drive means being arranged to firstly drive the pull-in means so that the pull-in means pulls the cassette into the holding means and thereafter drive the holding means so that the holding means moves in said second direction to place the cassette at said loading position.

11. In an apparatus using a disc-shaped record bearing medium housed in a thin box-shaped cassette, said cassette being provided with first and second side parts parallel to each other, a window disposed near said first side part to expose a portion of the medium, a cover movable along said first side part to close and open said window, and at least two positioning holes for positioning the cassette at a loading position by engaging with a positioning member in the apparatus, the first one of which is disposed near said first side part; the cassette being insertable into the apparatus along a first direction parallel to said side parts;
a cassette loading device comprising:
(a) holding means for receiving and holding said cassette, which holding means receives the cassette inserted into the apparatus along the first direction parallel to said side parts and loads said cassette inserted into the holding means to the loading position in said apparatus;
(b) opening means for moving said cover of the cassette to open the window according to the cassette being inserted and pulled into said holding means in the apparatus in said first direction; and
(c) pull-in means for pulling the cassette inserted to a predetermined amount into said holding means in the first direction, to a completely mounted position in said holding means in said first direction, said pull-in means having an engaging member engageable with said first positioning hole near said first side part and said cover and pulling the cassette in said holding means at said first positioning hole thereof by said engaging member, said engaging member being arranged to engage with said first positioning hole when said cassette has been inserted to said predetermined amount into said holding means.

12. The device according to claim 11, wherein said engaging member has an elasticity.

13. The device according to claim 12, wherein said engaging member consists of a leaf spring.

14. The device according to claim 11, wherein said engaging member of said pull-in means is arranged to engage with the first positioning hole of the cassette when the cassette is inserted into the apparatus to a predetermined position in said first direction.

15. The device according to claim 11, further comprising:
holding means for receiving and holding the cassette, said holding means being arranged to receive the cassette from said first direction and movable in a predetermined second direction substantially perpendicular to said first direction to place the cassette at a predetermined loading position;
said opening means being arranged to move said cover of the cassette when the cassette is inserted and pulled into said holding means; and
said pull-in means being arranged to pull the cassette into said holding means.

16. The device according to claim 15, wherein said pull-in means is movable relative to said holding means in said first direction to pull the cassette into the holding means.

17. The device according to claim 16, wherein said pull-in means is movably supported by said holding means.

18. The device according to claim 17, wherein said engaging member of said pull-in means is arranged to engage with the first positioning hole of the cassette when the cassette is inserted into said holding means to a predetermined position in said first direction.

19. The device according to claim 18, wherein said holding means has a room with a ceiling wall, to receive the cassette; and said pull-in means is supported by said ceiling wall with said engaging member projected into said room.

20. The device according to claim 18, wherein said opening means is provided on a portion of said holding means.

21. The device according to claim 16 further comprising:
device means for sequentially and independently driving said pull-in means and said holding means so that the pull-in means is firstly moved to a predetermined position in said first direction to pull the cassette into the holding means and thereafter the holding means is moved in said second direction to place to cassette at said loading position.

22. The device according to claim 15, further comprising:

drive means for driving said pull-in means and said holding means, said drive means being arranged to firstly drive the pull-in means so that the pull-in means pulls the cassette into the holding means and thereafter drive the holding means so that holding means moves in said second direction to place the cassette at said loading position.

23. An apparatus for recording on and reproducing from a record bearing medium housed in a cassette which has a window to exposed to portion of the medium, including a cover movable to close and open said window and at least one positioning hole near said window for maintaining the cassette in a predetermined loading position within the apparatus, said apparatus comprising:
(a) holding means for receiving and holding the cassette, said holding means being arranged to receive the cassette in a first direction and movable in a second direction different from said first direction to carry and placer the cassette at the loading position;
(b) positioning means arranged in said apparatus and engageable with the positioning hole of the cassette to position the cassette at the loading position in the state that the cassette is carried to the loading position:
(c) means for recording signals on and reproducing recorded signals from the medium in a condition wherein the cassette is positioned at said loading position; and
(d) pull-in means for pulling the cassette into said holding means in said first direction in response to the operation of the cassette inserted in the holding means in said first direction, said pull-in means having an engaging member engageable with the positioning hole of the cassette near said window, said pull-in means being arranged to engage with said positioning hole when said cassette is inserted to a predetermined position in the first direction and received by said holding means and to pull said cassette into said holding means by engagement of said engaging member with said positioning hole.

24. The apparatus according to claim 23, wherein said pull-in means is movable relative to said holding means in said first direction to pull the cassette into the holding means.

25. The apparatus according to claim 24, wherein said pull-in means is movably supported by said holding means.

26. The apparatus according to claim 25, wherein said engaging member of said pull-in means is arranged to engage with the positioning part of the cassette when the cassette is inserted into said holding means to a predetermined position in said first direction.

27. The apparatus according to claim 26, wherein said holding means has a room with a ceiling wall, to receive the cassette; and said pull-in means is supported by said ceiling wall with said engaging member projected into said room.

28. An apparatus for recording on and reproducing from a disc-shaped record bearing medium housed in a thin box-shaped cassette; and said cassette being provided with first and second side parts parallel to each other, a window disposed near said first side part to expose a portion of the medium, a cover movable along said first side part to close and open said window, and at least two positioning holes for positioning the cassette at a loading position in the apparatus, the first one of which is disposed near said first side part and said cover; and the cassette being insertable into the apparatus along a first direction parallel to said side parts;
said apparatus comprising:
(a) a cassette holder for receiving and holding the cassette, said holder having an opening for receiving the cassette and being arranged to receive the cassette from said first direction and movable in a predetermined second direction substantially perpendicular top said first direction to place the cassette at said loading position;
(b) positioning pins respectively engageable with the positioning holes of the cassette to position the cassette at said loading position;
(c) opening means for moving said cover of the cassette to open the window when the cassette is inserted and pulled into said holder from said first direction;
(d) a head for recording signals on and reproducing recorded signals from the medium, said head being arranged to confront a recording surface of the medium through the opened window of the cassette when the cassette is placed at said loading position;
(e) rotating means for rotating the medium relative to said head, said rotating means being engageable with a portion of the medium when the cassette is placed at said loading position; and
(f) pull-in means for pulling the cassette inserted through the opening into said holder in said first direction, said pull-in means having an engaging member engageable with said first positioning hole near said first side part and said cover, said engaging member being arranged to engage with said first positioning hole in response to the action of said cassette inserted to the predetermined amount in said first direction into said holder and then to house said cassette in said holder by pulling said first positioning hole of said cassette with engagement of said positioning hole and said engaging member.

29. The device according to claim 28, wherein said pull-in means is movable relative to said holder in said first direction t pull the cassette into the holding means.

30. The device according to claim 29, wherein said pull-in means is movably supported by said holder.

31. The device according to claim 30, wherein said engaging member of said pull-in means is arranged to engage with the first positioning hole of the cassette when the cassette is inserted into said holder to a predetermined position in said first direction.

32. The device according to claim 31, wherein said opening means is provided on a portion of said holder.

33. The device according to claim 30, further comprising:
drive means for sequentially and independently driving said pull-in means and said holder so that the pull-in means is firstly moved to a predetermined position in said first direction to pull the cassette into the holder and thereafter the holder is moved in said second direction to place the cassette at said loading position.

34. The device according to claim 28, further comprising:
drive means for driving said pull-in means and said holder, said drive means being arranged to firstly drive the pull-in means so that the pull-in means pulls the cassette into the holder and thereafter drive the holder so that the holder moves in said second direction to place the cassette at said loading position.

35. A cassette loading device using a cassette having a movable shutter for opening and closing a window of said cassette and having a positioning hole, arranged near the shutter, for positioning the cassette at a loading position, said cassette loading device comprising:
(a) an opening enabling insertion of the cassette therethrough;
(b) a first engaging member which engages with said positioning hole of the cassette inserted through the opening;
(c) a second engaging member which engages with said positioning hole of the cassette positioned in said loading position, thereby positioning said cassette in said loading position;
(d) detection means for detecting that the cassette is inserted through the opening;
(e) drive means for moving the first engaging member to carry the cassette to the loading position in response to the detection of the detection means and positioning the cassette at the loading position with engagement of the cassette with the second engaging member; and
(f) shutter opening means for opening said shutter in association with the operation of carrying said cassette to the loading position by means of said first engaging member.

36. A device according to claim 35, wherein said first engaging member comprises an elastic member.

37. A device according to claim 36, wherein said engaging member consists of a leaf spring.

* * * * *